United States Patent
Foncellino et al.

(10) Patent No.: US 11,898,989 B2
(45) Date of Patent: Feb. 13, 2024

(54) DEVICE FOR DETECTING PARTICULATE AND ONE OR MORE GASES IN THE AIR

(71) Applicant: STMICROELECTRONICS S.r.l., Agrate Brianza (IT)

(72) Inventors: Francesco Foncellino, Casagiove (IT); Luigi Barretta, Melito di Napoli (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/824,586

(22) Filed: May 25, 2022

(65) Prior Publication Data
US 2022/0381739 A1    Dec. 1, 2022

(30) Foreign Application Priority Data
May 28, 2021   (IT) ........................ 102021000014063

(51) Int. Cl.
    *G01N 29/00*      (2006.01)
    *G01N 29/02*      (2006.01)
    (Continued)

(52) U.S. Cl.
CPC ......... *G01N 29/022* (2013.01); *G01N 29/036* (2013.01); *G01N 29/222* (2013.01); *G01N 2291/02408* (2013.01)

(58) Field of Classification Search
CPC .. G01N 29/022; G01N 29/036; G01N 29/222; G01N 2291/02408;
(Continued)

(56) References Cited

U.S. PATENT DOCUMENTS 4,484,478 A * 11/1984 Harkonen ................. G01F 1/74
                                                                  73/861.25
2002/0083771 A1 * 7/2002 Khuri-Yakub ....... G01N 29/223
                                                                  73/64.53
(Continued)

FOREIGN PATENT DOCUMENTS

| DE | 10337692 B3 | 3/2005 | |
|---|---|---|---|
| EP | 1316796 A1 * | 6/2003 | ........... G01N 1/2252 |
| TW | I678521 B | 12/2019 | |

OTHER PUBLICATIONS

Ejeian et al., "Design and applications of MEMS flow sensors: A review," *Sensors and Actuators A: Physical*, vol. 295: 483-502, Jun. 2019.
(Continued)

*Primary Examiner* — Francis C Gray
(74) *Attorney, Agent, or Firm* — Seed IP Law Group LLP

(57) ABSTRACT

A MEMS device for detecting particulate and gases in the air, comprising: a first semiconductor body; a second semiconductor body with a first surface facing a first surface of the first semiconductor body; and a first spacer element and a second spacer element, which extend between the first surfaces of the semiconductor bodies so as to arrange them at a distance apart from one another and define a first duct. The MEMS device further comprises at least one of the following: a first particulate sensor comprising a first emitter unit for generating acoustic waves in the first duct, and a first particulate-detection unit for detecting the particulate, the first emitter unit and the first particulate-detection unit facing one another through the first duct; and a first gas sensor, which faces the first duct and is configured to detect said gases in the air present in the first duct.

21 Claims, 12 Drawing Sheets

(51) Int. Cl.
*G01N 29/036* (2006.01)
*G01N 29/22* (2006.01)

(58) Field of Classification Search
CPC ....... G01N 15/0606; G01N 2015/0046; G01N 2291/0256; G01N 2291/0215
See application file for complete search history.

(56) References Cited

U.S. PATENT DOCUMENTS

| | | |
|---|---|---|
| 2011/0154890 A1 | 6/2011 | Holm et al. |
| 2012/0079871 A1 | 4/2012 | Williamson |
| 2013/0036793 A1* | 2/2013 | White .............. G01N 15/0255 73/24.02 |
| 2018/0156706 A1* | 6/2018 | Dehe .................... G01N 29/032 |
| 2019/0145874 A1* | 5/2019 | Woolsey ................. B04B 5/08 73/863.12 |
| 2021/0123849 A1 | 4/2021 | Singh et al. |
| 2021/0247288 A1* | 8/2021 | Koppinen .......... G01N 15/0606 |

OTHER PUBLICATIONS

Lenshof et al., "Acoustofluids 5: Building microfluidic acoustic resonators," *The Royal Society of Chemistry, Lab Chip*, vol. 12: 684-695, Feb. 2012.

Mulvana et al., "Ultrasound assisted particle and cell manipulation on-chip," *Advanced Drug Delivery Reviews* 65(11-12): 1-22, Nov. 2013.

Paprotny et al., "Microfabricated Air-Microfluidic Sensor for Personal Monitoring of Airborne Particulate Matter: Design, Fabrication, and Experimental Results," *Sensors and Actuators A: Physical*, vol. 201: 506-516, Oct. 2013.

Yang et al., "An Ultra-High Element Density pMUT Array with Low Crosstalk for 3-D Medical Imaging," *Sensors*, vol. 13: 9624-9634, Jul. 2013.

* cited by examiner

DEVICE FOR DETECTING PARTICULATE AND ONE OR MORE GASES IN THE AIR

BACKGROUND

Technical Field

The present disclosure relates to a device for detecting particulate and one or more gases in the air. In particular, it regards an integrated MEMS sensor configured to detect gases and particulate, an apparatus comprising the MEMS device (or sensor), and a method for manufacturing the MEMS device.

Description of the Related Art

As is known, environmental sensors enable detection of parameters such as the quality of air, atmospheric pollution, and the presence of certain gases in the atmosphere. This is of fundamental importance for determining the quality of life in given populated areas and for adopting some precautions or remedies in order to reduce or contain the number of elements harmful for the health of human beings (e.g., control of traffic according to the levels of pollution detected).

In the last few years, various portable apparatuses have been marketed, which comprise one or more environmental sensors inside them and enable the user (even a non-expert user, e.g., even an average buyer who does not use them for professional purposes) to evaluate the quality of the air of the place where he or she is. This should make it possible to make people aware of the problem of atmospheric pollution, but above all make it possible for the user to adopt some precautions to counter the potential harmful effects of pollution (e.g., wearing filtering masks when moving around in the town when the levels of pollution exceed critical thresholds).

In particular, the above portable apparatuses generally enable detection of atmospheric particulate (with a size usually comprised between approximately 1 µm and approximately 10 µm of diameter) and, in some embodiments, of specific gases harmful for the health of humans (e.g., CO, $CO_2$, NO, $NO_2$).

However, portable apparatuses currently on sale are voluminous, complex to produce, costly and thus not convenient to carry around and use in so far as they comprise various environmental sensors, each of a macroscopic type, which are each manufactured independently and are then assembled together on an electronic board (e.g., a printed circuit board or PCB) and are housed within the portable apparatus. This renders currently known portable apparatuses difficult to use by non-professional users (e.g., by users who do not use them frequently in their normal working activity).

In addition, environmental sensors require a periodic maintenance that at the moment calls for a manual intervention by the user (or a periodic check by expert professionals, thus causing inconvenience of organization and additional costs for the user).

BRIEF SUMMARY

The present disclosure provides a MEMS device, an apparatus comprising the MEMS device, and a method for manufacturing the MEMS device that will, among others, overcome the drawbacks of the existing solutions.

According to the present disclosure a MEMS device, an apparatus comprising the MEMS device, and a method for manufacturing the MEMS device are provided.

BRIEF DESCRIPTION OF THE SEVERAL VIEWS OF THE DRAWINGS

For a better understanding of the present disclosure, embodiments thereof are now described with reference to the attached drawings, wherein.

Elements that are in common to the various embodiments of the present disclosure, described herein, are designated by the same reference numbers.

DETAILED DESCRIPTION

Figure 1:
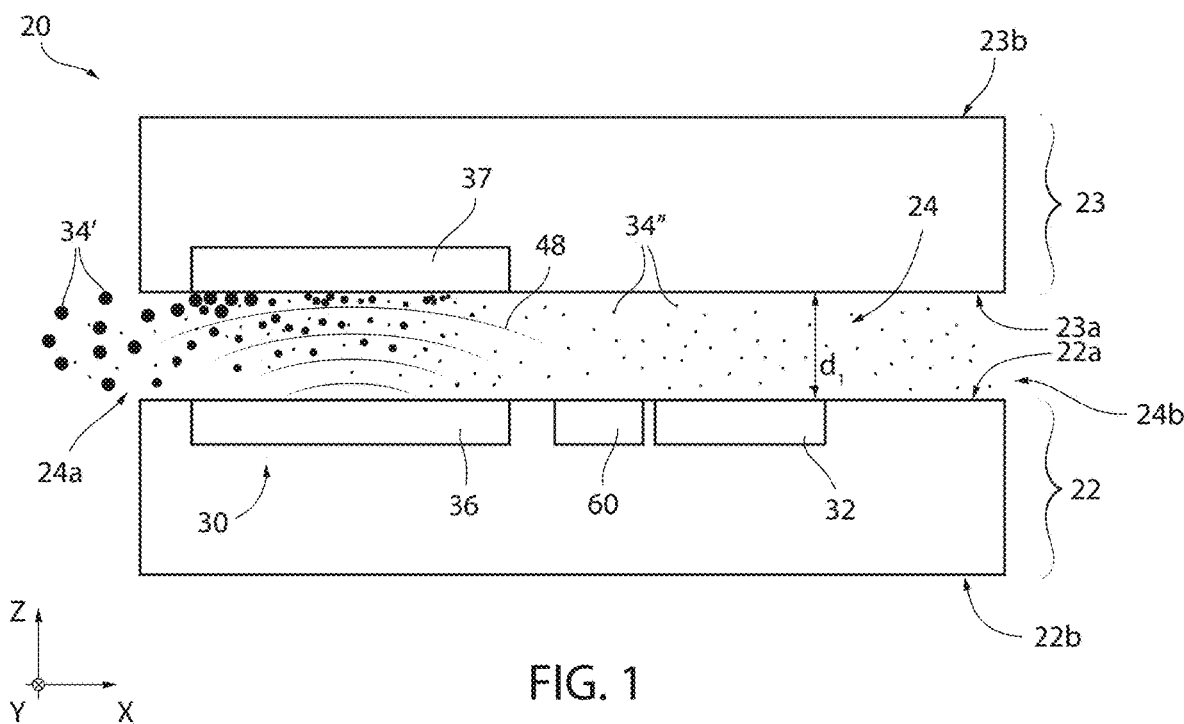
FIG. 1 is a schematic lateral sectional view of a MEMS device for detecting atmospheric particulate and gases, according to an embodiment of the MEMS device, the MEMS device comprising a particulate sensor and a gas sensor.

FIG. 1 is a schematic illustration, in lateral sectional view in a (triaxial) Cartesian reference system of axes X, Y, Z, of a MEMS device 20, for example, a MEMS sensor for detecting atmospheric particulate and gases. For example, the MEMS device 20 is configured to be mounted in an apparatus (illustrated in FIG. 1A by the reference number 100, such as a smartphone or personal protective equipment "PPE") so as to make it possible for the latter to acquire in a simple and fast way information on the environment where it is located, for example, information on the quality of air.

The MEMS device 20 comprises a first semiconductor body 22 (of semiconductor material such as silicon) and a second semiconductor body 23 (of semiconductor material such as silicon) facing one another and coupled together so as to be arranged at a distance from one another, thus forming a duct 24 (e.g., a micro-channel), through which a fluidic medium, e.g., air, and thus particulate and the gases carried thereby, can circulate. In detail, the first semiconductor body 22 has a main extension or dimension by way of example parallel to a plane XY (defined by the axes X and Y) and has a first surface 22a and a second surface 22b opposite to one another with respect to the axis Z, and the second semiconductor body 23 has a main extension or dimension by way of example parallel to the plane XY and has a respective first surface 23a and a respective second surface 23b opposite to one another with respect to the axis Z. The first surfaces 22a and 23a of the semiconductor bodies 22 and 23 face one another. The semiconductor bodies 22 and 23 are fixed with respect to one another, as discussed more fully hereinafter, in such a way that the first surfaces 22a and 23a are arranged at a distance from one another.

For example, in a way not illustrated in FIG. 1, spacer elements 26 (FIG. 5) extend in a direction transverse to the plane XY, and thus in a direction transverse, for example, orthogonal, to the first surfaces 22a and 23a, to join together the semiconductor bodies 22 and 23 keeping them at a distance from one another. According to an embodiment illustrated in FIG. 5, the MEMS device 20 comprises a first spacer element 26a and a second spacer element 26b, which are fixed to the first surfaces 22a and 23a and are interposed between the semiconductor bodies 22 and 23.

Figure 5:
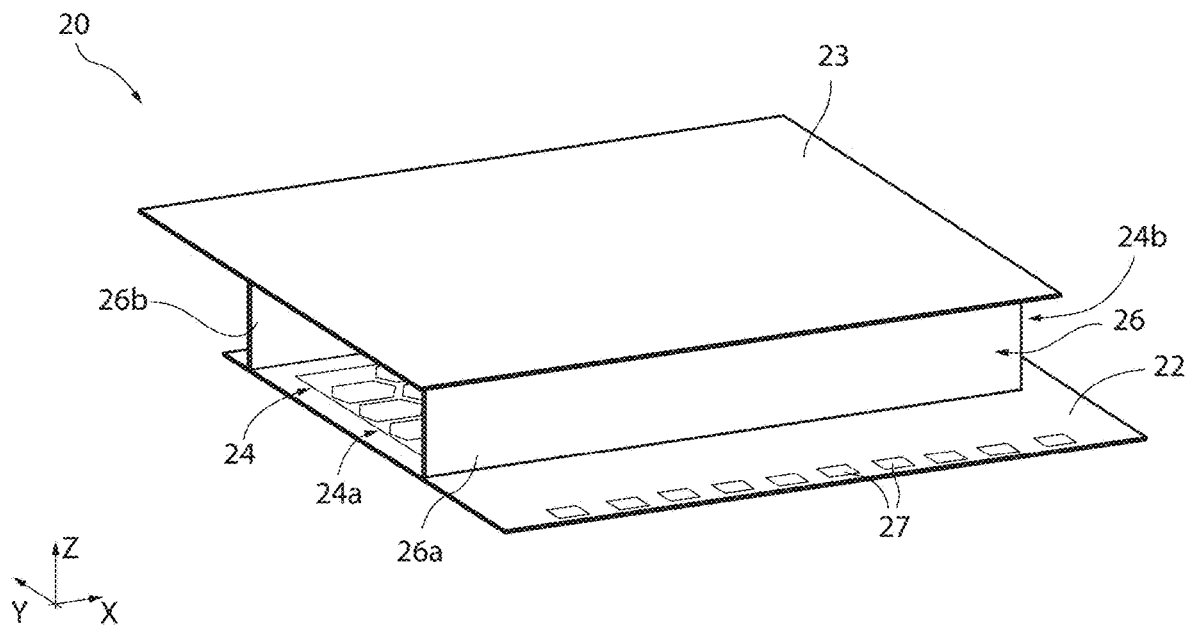
FIG. 5 is a perspective view of the MEMS device of FIG. 1, according to an embodiment.

As illustrated in FIG. 5, the semiconductor bodies 22 and 23 and the spacer elements 26a and 26b externally define and delimit the duct 24, which has a main extension or dimension direction by way of example parallel to the axis X. The duct 24 is in fluidic and pneumatic communication with an environment external to the MEMS device 20 through a first opening 24a and a second opening 24b opposite to one another along the axis X. In other words, the semiconductor bodies 22 and 23 and the spacer elements 26a and 26b define an internal volume of the MEMS device 20 that is delimited along the axes Y and Z and is open towards the outside through the first and second openings 24a and 24b. Air coming from the outside can thus traverse the duct 24 entering from the first opening 24a and exiting from the second opening 24b, or vice versa, as discussed more fully herein.

The MEMS device 20 comprises a particulate sensor 30 for detecting particulate (designated in FIG. 1 by the reference number 34') in the air present in the duct 24, and one or more gas sensors 32 for detecting one or more gases (herein reference is made by way of example to a gas designated by the reference number 34", such as $NO_2$ or $NH_3$) that may be present in the air.

In detail, the particulate sensor 30 comprises an emitter unit 36 that can be governed for generating acoustic waves in the duct 24, and a particulate-detection unit (herein also referred to as PM-detection unit) 37 for detecting the particulate 34'. The emitter unit 36 and the PM-detection unit 37 are carried by the first semiconductor body 22 and by the second semiconductor body 23 and extend from sides opposite to one another of the duct 24 so as to face each other. Considered by way of example herein is the case where the emitter unit 36 is comprised in the first semiconductor body 22 and is formed at the first surface 22a of the latter and where the PM-detection unit 37 is comprised in the second semiconductor body 23 and is formed at the first surface 23a of the latter; however, this case is here considered only by way of non-limiting example, and it is thus also possible for the emitter unit 36 to be comprised in the second semiconductor body 23 and for the PM-detection unit 37 to be comprised in the first semiconductor body 22.

In detail, the emitter unit 36 and the PM-detection unit 37 are respective ultrasonic transducer devices, for example, piezoelectric ultrasonic transducers obtained with MEMS technology, referred to as piezoelectric micromachined ultrasonic transducers "PMUTs" ( ).

In use, as described more fully hereinafter, the emitter unit 36 generates acoustic waves, designated in FIG. 1 by the reference number 48, which propagate in a direction transverse with respect to the duct 24, e.g., the direction of propagation is parallel to the axis Z, and deflect the paths of the particulate 34' towards the PM-detection unit 37, by acoustophoresis. For example, the particulate 34' present in the duct 24 undergoes, on account of the acoustic waves 48 (which are standing ultrasonic waves in the duct 24), forces of acoustic radiation that cause transport of the particulate 34' towards a nodal plane of pressure that is located at the PM-detection unit 37. Consequently, on account of a pressure caused by the acoustic waves 48 that is lower at the PM-detection unit 37 as compared to the rest of the duct 24, the particulate 34' is forced towards the PM-detection unit 37, to which it thus remains attached as discussed more fully herein.

In use, the PM-detection unit 37 detects the particulate 34' that has gathered on the PM-detection unit 37 itself on account of the acoustic waves 48. For example, the PM-detection unit 37 is provided so as to present frequencies of mechanical vibrations different from the frequency of the ultrasonic waves generated by the emitter unit 36. Consequently, the PM-detection unit 37 does not vibrate as a result of the acoustic waves 48 emitted by the emitter unit 36. The PM-detection unit 37 is arranged in vibration by an electrical signal, as described more fully herein, in order to detect the effective resonance frequency of the PM-detection unit 37. The mass of the particulate matter 34' that has gathered on the PM-detection unit 37 determines a variation of the mass of the PM-detection unit 37, and thus a modification of the resonance frequency of the latter. The variation of the resonance frequency of the PM-detection unit 37 is thus a function of the amount of particulate 34' present on the PM-detection unit 37. By measuring the resonance frequency of the PM-detection unit 37 it is thus possible to obtain information as regards parameters such as the amount and size of the particulate 34' present in the air.

Figure 2A:
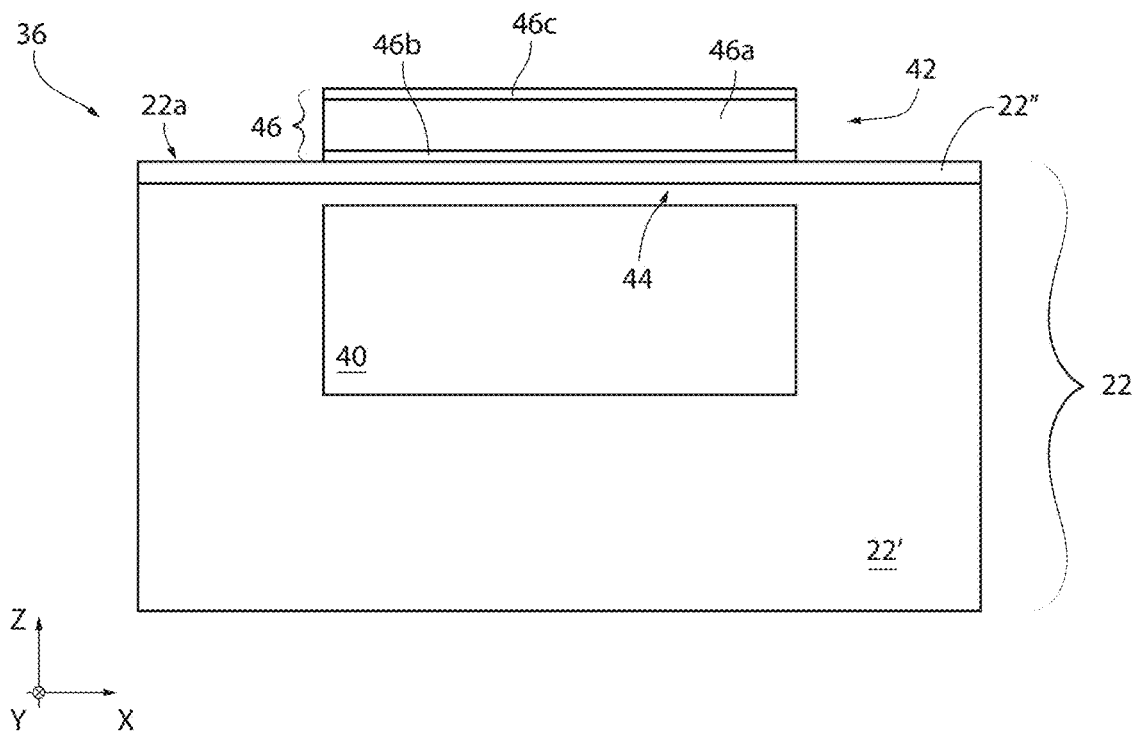
FIGS. 2A and 2B are lateral sectional views of respective details of the particulate sensor comprised in the MEMS device of FIG. 1, according to an embodiment.

FIG. 2A shows the structure of the emitter unit 36.

As illustrated in FIG. 2A, the emitter unit 36 is formed in the first semiconductor body 22, at the respective first surface 22a.

A first buried cavity 40 extends in the first semiconductor body 22 at the first surface 22a of the first semiconductor body 22, and is separated from the duct 24 through a membrane 42 suspended over the first buried cavity 40. As described more fully herein, the first buried cavity 40 may be in fluidic connection with the duct 24 through one or more holes provided in the membrane 42, or may be in fluidic connection with the environment external to the MEMS device 20 through one or more holes or openings in the first semiconductor body 22 that reach the second surface 22b of the first semiconductor body 22, or may be isolated from a fluidic standpoint both with respect to the duct 24 and with respect to the external environment (in this case, in some embodiments, a predefined amount of air is introduced into the first buried cavity 40 during manufacture of the emitter unit 36).

For example, the membrane 42 is formed by a membrane body 44 that is provided starting from the first semiconductor body 22 and that forms the first surface 22a of the first semiconductor body 22, and by an actuation unit 46, which is mechanically coupled to the first semiconductor body 22 (which, for example, extends over the first semiconductor body 22) and can be configured for inducing the membrane 42 to vibrate.

In detail, the first semiconductor body 22 comprises a substrate 22' of semiconductor material (e.g., silicon) and an oxide layer 22", e.g., of insulating material such as silicon dioxide, which extends over the substrate 22' and forms the first surface 22a of the first semiconductor body 22. The portion of substrate 22' and oxide layer 22" suspended over the first buried cavity 40 forms the membrane body 44.

Furthermore, the actuation unit 46 comprises a piezoelectric layer 46a (of piezoelectric material such as PZT) interposed along the axis Z between a first electrode 46b and a second electrode 46c (which are conductive, for example of metal material such as platinum, gold, or copper or of semiconductor material with high concentration of dopant species such as silicon with a concentration of dopant species of an N type higher than $10^{18}$ at/cm$^3$), which can be biased for generating a potential difference across the piezoelectric layer 46a and for inducing consequently an elastic deformation of the piezoelectric layer 46a, and thus of the membrane 42, by the reverse piezoelectric effect. For instance, the first electrode 46b extends in contact with the membrane body 44 (thus on the oxide layer 22", in contact with the first surface 22a of the first semiconductor body 22), and the second electrode 22b extends on the opposite side of the piezoelectric layer 46a with respect to the first electrode 46b.

Figure 2B:
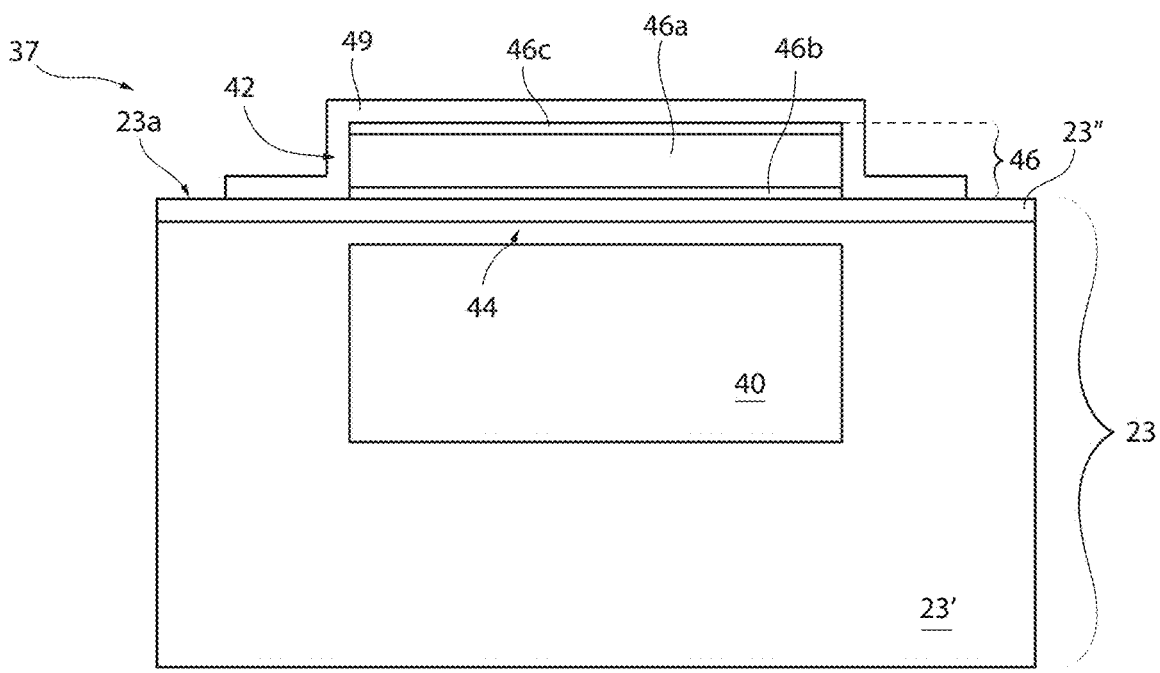

The structure of the PM-detection unit 37, illustrated in FIG. 2B, is similar to that of the emitter unit 36 and thus is not described again. However, the first buried cavity 40 of the PM-detection unit 37 may contain air, and thus is in fluidic connection with the duct 24 through one or more holes in the membrane 42, or is in fluidic connection with the environment external to the MEMS device 20 through one or more holes or openings in the second semiconductor body 23 that reach the second surface 23b of the second semiconductor body 23, or is isolated from a fluidic standpoint both with respect to the duct 24 and with respect to the external environment but air is introduced into the first buried cavity 40 during manufacture (e.g., at approximately the same pressure that the air circulating in the duct 24 will have in use). In some embodiments, in addition to what has been said with reference to the emitter unit 36, the PM-detection unit 37 further comprises, as illustrated in FIG. 2B, a particulate-adhesion layer 49 (herein also referred to as PM-adhesion layer 49, for example of polymeric material such as photoresist), which extends over the membrane 42 (in detail, over the actuation unit 46 and, in some embodiments, on part of the first surface 23a of the second semiconductor body 23) and improves adhesion of the particulate 34' to the PM-detection unit 37. Said adhesion is selective thanks to the choice of the material of the PM-adhesion layer 49 (a choice that is based upon criteria in themselves known), and thus only the particulate 34' adheres and remains bonded to the emitter unit 36.

In use, the emitter unit 36 faces, and is in contact with, the air in the duct 24.

In use, the emitter unit 36 is operated in a transmitting mode thereof (e.g., it functions as actuator), and thus the membrane 42 is arranged in vibration by the actuation unit 46. Vibration of the membrane 42 causes generation and propagation in the air of the acoustic waves 48; this is obtained by applying an actuation voltage of an AC type between the electrodes 46b and 46c, and thus controlling the mechanical deformation of the piezoelectric layer 46a. In detail, the emitter unit 36 is controlled to have the membrane 42 that vibrates to a first resonance frequency comprised, by way of example, between approximately 100 kHz and approximately 1 MHz. The acoustic waves 48 of a stationary type deflect, by the acoustophoretic effect, the paths of the particulate 34', which passes though the duct 24, towards the PM-detection unit 37. For example, the deviation of the paths of the particulate 34' increases as the size of the particulate 34' increases (in other words, the particulate with a greater equivalent diameter is deflected more towards the PM-detection unit 37).

In use, the PM-detection unit 37 is substantially inert in regard to the acoustic waves 48; in other words, the PM-detection unit 37 is designed to vibrate (also considering the possible contribution provided by the particulate 34' that adheres thereto) at second frequencies that are different from the first resonance frequency of the emitter unit 36. For example, when the acoustic waves 48, which are generated by the emitter unit 36 and which propagate in the air present in the duct 24, impinge upon the membrane 42 of the PM-detection unit 37, a first part of the energy of the acoustic waves 48 is reflected towards the emitter unit 36, whereas a second part propagates as elastic waves through the PM-detection unit 37 (in detail, in the respective first buried cavity 40). Consequently, the emitter unit 36, the duct 24, and the PM-detection unit 37 form a multilayer acoustic resonator. In order to detect the resonance frequency thereof (referred to herein as "second resonance frequency"), the PM-detection unit 37 is arranged in vibration in a pre-set range of second frequencies. For example, a chirp signal (e.g., having frequencies varying, in time, between approximately 80 kHz and approximately 120 kHz, and in any case so as to comprise in said frequency range the second resonance frequency) is supplied, as described more fully herein, to the PM-detection unit 37 in order to cause vibration of the membrane 42 of the PM-detection unit 37. This vibration varies in time on the basis of the chirp signal: when the chirp signal reaches the second resonance frequency (which depends upon the design of the PM-detection unit 37 and upon the particulate 34' attached thereto, if present), the membrane 42 of the PM-detection unit 37 resonates. Consequently, by measuring the frequency response of the vibration of the membrane 42 of the PM-detection unit 37 it is possible to detect the second resonance frequency. By comparing then the second resonance frequency measured with a reference resonance frequency (e.g., the second resonance frequency of the PM-detection unit 37 in the absence of particulate 34'), it is possible to determine the amount of particulate 34' on the PM-detection unit 37. In greater detail, the relations $\Delta f = f_{meas} - f_{ref}$, with $\Delta f = k \cdot m_{part} \cdot f_{ref}$, $\Delta f = k \cdot m_{part} \cdot f_{rif}$ apply, where $f_{meas}$ $f_{mes}$ is the second resonance frequency, $f_{rif}$ $f_{ref}$ is the reference resonance frequency, $m_{part}$ $m_{part}$ is the mass of the particulate 34' attached to the PM-detection unit 37, k is a multiplicative constant depending upon the structure (e.g., geometry and materials) of the PM-detection unit 37 (e.g., is of the order of magnitude of $10^{-5}$ ng$^{-1}$ or $10^{-5}$ pg$^{-1}$), and $\Delta f$ is the variation of the second resonance frequency caused by the particulate 34' on the PM-detection unit 37. In greater detail, the chirp signal causes vibration of the membrane 42 of the PM-detection unit 37, which generates an elastic deformation of the actuation unit 46, which in turn causes generation of a detection current between the electrodes 46b and 46c (in fact, the PM-detection unit 37 can be represented with the equivalent circuit constituted by a capacitor in parallel with an RLC circuit). By acquiring the detection current, which is a function of the second resonance frequency, it is thus possible to obtain information on vibration of the membrane 42 of the PM-detection unit 37. For instance, the reference resonance frequency is comprised between 100 kHz and 1 MHz (in any case, it is different from the first detection frequency, and for example a difference between the first and second detection frequencies is greater than approximately 50 kHz), and the second resonance frequency can vary by approximately 1% with respect to the value of the reference resonance frequency.

Further, the PM-detection unit 37 can also function as actuator to favor detachment of the particulate 34' and thus cleaning of the PM-detection unit 37. This operating mode of the PM-detection unit 37 is also referred to herein as self-cleaning mode of the PM-detection unit 37 or of the particulate sensor 30. For example, in the self-cleaning mode, the membrane 42 is arranged in vibration by the actuation unit 46 so as to favor detachment of the particulate 34' from the PM-detection unit 37. As already described for the emitter unit 36, vibration of the membrane 42 of the PM-detection unit 37 causes generation and propagation in air of stationary acoustic waves; this is obtained by applying a further actuation voltage of an AC type between the electrodes 46b and 46c, and thus controlling mechanical deformation of the piezoelectric layer 46a. In detail, the PM-detection unit 37 is controlled, in self-cleaning mode, to present amplitudes of oscillation of the membrane 42 greater than those used for detecting the particulate 34' (e.g., approximately 50 to 100 times greater), and/or by signals with non-sinusoidal waveforms (e.g., square-wave or triangular-wave signals). The usefulness of operating the PM-detection unit 37 in self-cleaning mode lies mainly in the fact that, by causing the membrane 42 of the PM-detection unit 37 to vibrate, detachment of the particulate 34' previously attached to the latter, and thus cleaning of the PM-detection unit 37, is favored and speeded up. Consequently, by operating periodically the PM-detection unit 37 in self-cleaning mode (e.g., by operating the PM-detection unit 37 in self-cleaning mode whenever the PM-detection unit 37 has been working for a period longer than a threshold period in reception mode), it is possible to clean the particulate 34' previously attached away from the PM-detection unit 37, thus restoring periodically the original mechanical and electrical properties of the PM-detection unit 37 and preventing phenomena of saturation of the particulate 34' on the PM-detection unit 37 and consequent wrong measurements of the particulate 34' present.

With reference again to FIG. 1, it is shown that the MEMS device 20 comprises said one or more gas sensors 32. FIG. 1 illustrates by way of example just one gas sensor 32 provided on the first surface 22a of the first semiconductor body 22. However, it is clear that the number and position of gas sensors 32 may vary. For instance, in a way not illustrated, the MEMS device 20 may comprise two gas sensors 32 provided on the first surfaces 22a and 23a of the first and second semiconductor bodies 22 and 23, respectively, so that they face one another through the duct 24. Otherwise, the number of gas sensors 32 may even be greater than two.

The gas sensor 32 is configured to detect one or more gases 34" present in the air that pass through the duct 24. Described by way of example herein is the case where the gas sensor 32 is designed for detecting just one type of gas 34" (e.g., CO, $CO_2$, NO, $NO_2$). However, what is discussed herein applies in a similar way to the case where the gas sensor 32 is designed for detecting simultaneously different types of gases 34".

Figure 3A:
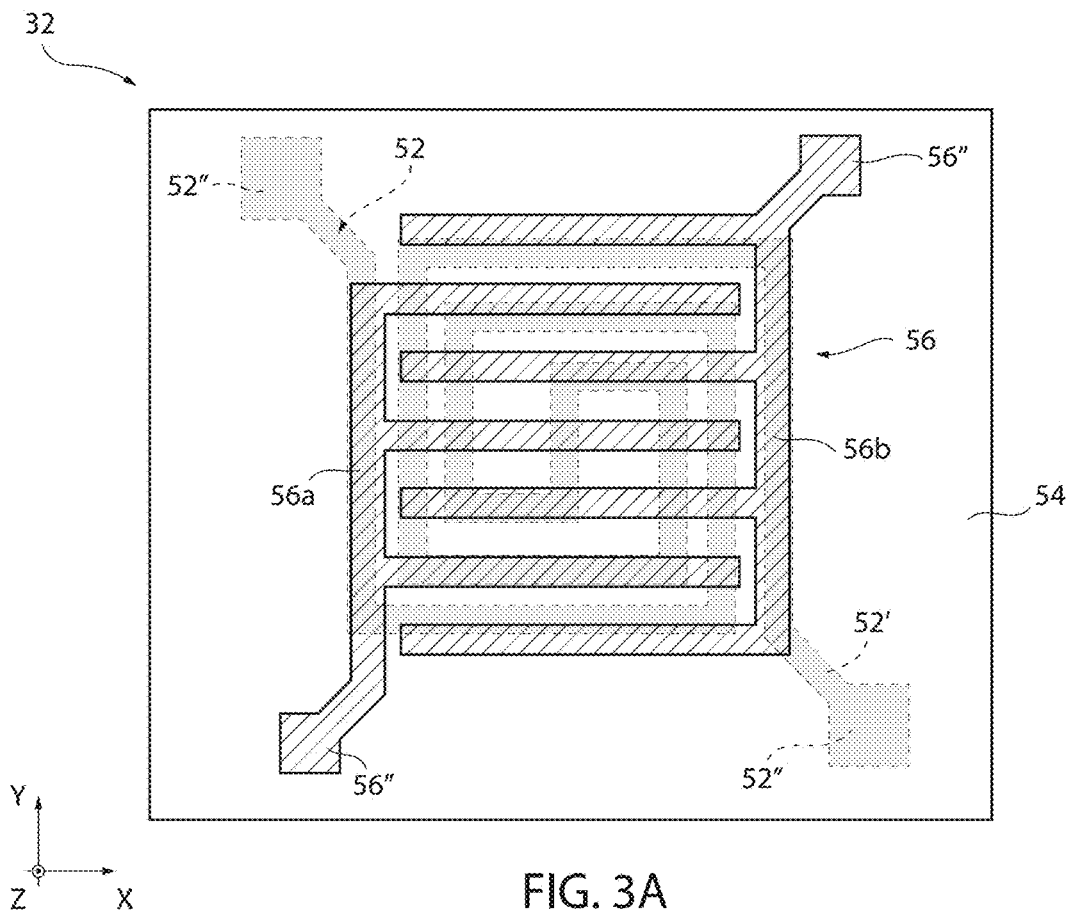
FIG. 3A is a top view of the gas sensor comprised in the MEMS device of FIG. 1, according to an embodiment of the gas sensor.
Figure 3B:
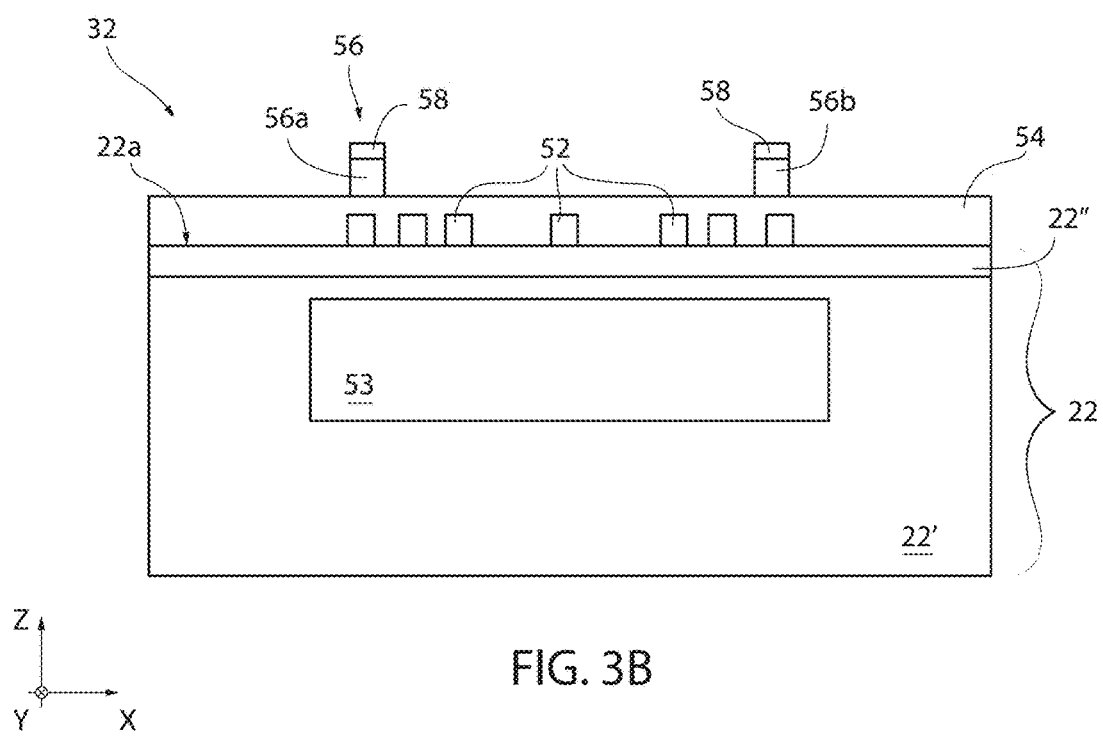
FIG. 3B is a schematic lateral sectional view of the gas sensor of FIG. 3A.

FIGS. 3A and 3B show the gas sensor 32 according to an embodiment.

For example, the gas sensor 32 illustrated in FIGS. 3A and 3B is formed in the first semiconductor body 22 (comprising the substrate 22' and the oxide layer 22"), on a second buried cavity 53.

A first heater element 52, e.g., of conductive material, for example metal such as platinum or gold, extends over the oxide layer 22" so as to overlie vertically the second buried cavity 53, and makes it possible, when traversed by an electric current, to heat the gas sensor 32 by the Joule effect. In detail, the first heater element 52 is formed by a metal strip 52' shaped so as to have a spiral shape, so as to maximize the path that the electric current has to follow to traverse the first heater element, consequently maximizing the heating supplied by the first heater element 52. In some embodiments, the first heater element 52 further comprises a first heater pad 52" and a second heater pad 52" joined to respective ends of the strip 52' that are opposite to one another with respect to the strip 52; the heater pads 52" enable electrical connection to an interface module 102 of the apparatus 100 (the interface module 102 being external to the MEMS device 20 and designed to bias the first heater element 52).

An electrically insulating layer 54 (of dielectric material such as $Si_3N_4$) extends over the first heater element 52 and over the portions of the first surface 22a of the first semiconductor body 22 not covered by the first heater element 52.

In addition, a gas-detection unit 56 extends on the electrically insulating layer 54. The gas-detection unit 56 comprises a first plate 56a and a second plate 56b capacitively coupled together thanks to the electrically insulating layer 54; in other words, the plates 56a and 56b form, with the electrically insulating layer 54, a capacitor. For instance, in order to maximize the capacitive coupling between the plates 56a and 56b, both the first plate 56a and the second plate 56b comprise a respective plurality of electrodes, and the electrodes of the first plate 56a are interdigitated with the electrodes of the second plate 56b. Furthermore, the gas-detection unit 56 comprises a gas-adhesion layer 58 (e.g., of SnO), which extends over the plates 56a and 56b and favors adhesion of the gas 34" to the gas sensor 32. Said adhesion is selective thanks to the choice of the material of the gas-adhesion layer 58 (a choice that is based on criteria in themselves known), and thus only the gas 34" to be detected adheres and remains attached to the gas-detection unit 56. In some embodiments, the gas-detection unit 56 further comprises a first detection pad and a second detection pad 56" joined to respective ends of the first and second plates 56a and 56b, respectively, which are opposite to one another with respect to the gas-detection unit 56; the detection pads 56" enable electrical connection with the interface module 102, which is external to the MEMS device 20 and is designed to acquire a potential difference generated between the first and second plates 56a and 56b.

In use, the gas sensor 32 generates said potential difference between the first and second plates 56a and 56b, which depends upon the amount of gas 34" attached to the gas-adhesion layer 58. In fact, adhesion of the gas 34" to the gas-detection unit 56 modifies the electrical properties of the latter, and thus causes a variation of the voltage between the plates 56a and 56b with respect to the case where the gas 34" is absent. This variation increases as the amount of gas 34" attached to the gas-adhesion layer 58 increases: consequently, by acquiring the voltage generated between the plates 56a and 56b it is possible to obtain information as regards the amount of gas 34" in the duct 24.

Further, in use, the first heater element 52 is biased so as to heat it by the Joule effect, thus generating a rise in temperature in the gas sensor 32 (in detail, in the electrically insulating layer 54 and in the gas-detection unit 56) due to known effects of heat transfer. The temperature of the gas-detection unit 56 affects absorption of the gas 34": it is thus possible to maximize the amount of gas 34" on the gas-detection unit 56 by heating the latter, by the first heater element 52, to a target temperature at which absorption of the gas 34" is maximum. This target temperature is specific for each gas and is per se known.

In addition, it has been found that, by using a same gas-adhesion layer 58, it is possible to cause adherence of different types of gases 34" (and thus detect the amount thereof by the gas-detection unit 56) as the temperature of the gas-detection unit 56 varies. In other words, it is for example possible to control the first heater element 52 so as to bring the gas-detection unit 56 into a first temperature range at which the gas-adhesion layer 58 enables adhesion of a first type of gas 34" and then it is possible to control the first heater element 52 differently so as to bring the gas-detection unit 56 into a second range of temperatures (e.g., higher than the temperatures of the first range) at which the gas-adhesion layer 58 enables adhesion of a second type of gas 34". In this way, the same gas sensor 32 can detect different types of gases 34".

With reference once again to FIG. 1, in some embodiments the MEMS device 20 further comprises at least one air-flow sensor (also referred to herein as air sensor) 60, which is configured to measure the air flow that traverses the duct 24. FIG. 1 illustrates by way of example just one air sensor 60 provided at the first surface 22a of the first semiconductor body 22. However, it is clear that the number and position of the air sensors 60 can vary. For instance, in a way not illustrated, the MEMS device 20 may comprise two air sensors 60 provided on the first surfaces 22a and 23a of the first and second semiconductor bodies 22 and 23, respectively, so as to face one another through the duct 24. Otherwise, the number of air sensors 60 may also be greater than two.

Figure 4A:
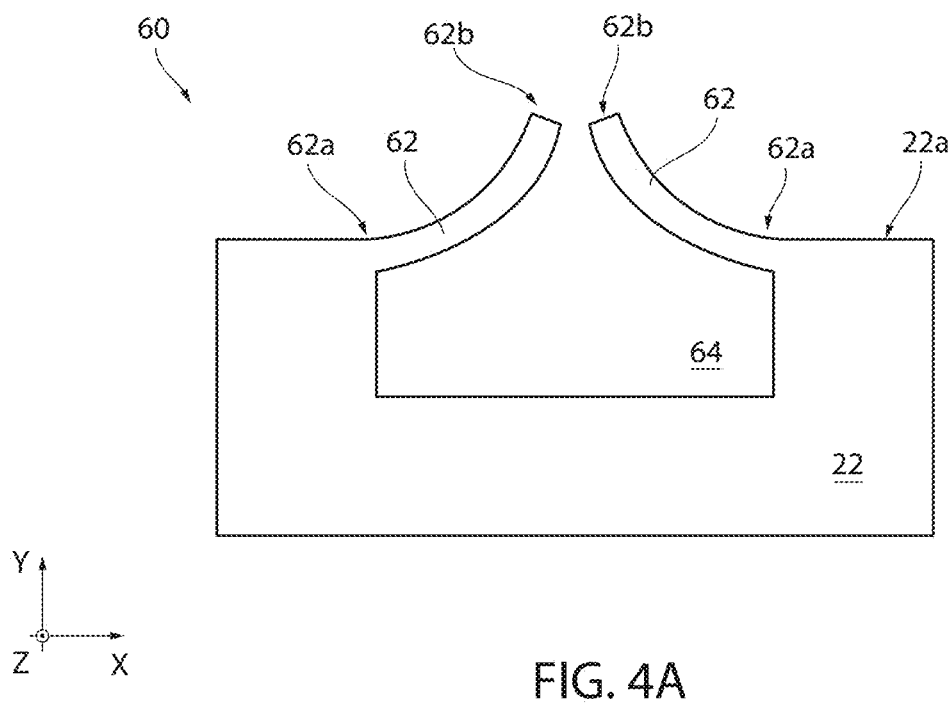
FIGS. 4A and 4B are lateral sectional views of an air-flow sensor in some embodiments comprised in the MEMS device of FIG. 1, according to respective embodiments.

According to an embodiment illustrated in FIG. 4A, the air sensor 60 comprises one or more suspended structures (for example, cantilevers) 62. Each suspended structure 62 is bent towards the duct 24, comprises a layer (not shown) of piezoelectric or piezoresistive material and is configured to generate an electrical signal (or for modifying its own electrical resistance) when the air flow in the duct 24 induces elastic deformation thereof with respect to an own position of equilibrium. This deformation (and thus the electrical signal generated or the variation of resistance) is proportional to the force applied to the suspended structure 62 by the air that traverses the duct 24. For instance, and in a way not illustrated, the air sensor 60 comprises a cavity 64 provided in the first semiconductor body 22 and facing the first surface 22a (e.g., having a polygonal shape in the plane XY, for example a square shape), and four cantilevers 62 suspended over said cavity 64 and coupled to respective lateral surfaces of the cavity 64. Each cantilever 62 has a first end 62a and a second end 62b opposite to one another, is fixed to the first semiconductor body 22 by its own first end 62a and has its own second end 62b free to oscillate. In the resting condition of the cantilever 62 (e.g., in the absence of forces applied to the cantilever 62 by the air in the duct 24), the first end 62a of the cantilever 62 is in the plane of the first surface 22a of the first semiconductor body 22, whereas the second end 62b of the cantilever 62 is at a distance, along the axis Z, from the first surface 22a of the first semiconductor body 22 and extends in the duct 24. Consequently, each cantilever 62 protrudes into the duct 24 towards the second semiconductor body 23. In use, when an air flow is present in the duct 24 (e.g., an air flow having a main direction of propagation parallel to the axis X), the cantilevers 62 that are opposite to one another with respect to the cavity 64 undergo forces, generated by the air flow, opposite to one another that cause respective elastic deformations thereof (one cantilever 62 is deflected towards the first semiconductor body 22, and the other cantilever 62 is deflected towards the second semiconductor body 23) that in turn induce generation of respective electrical signals (in the case where the cantilevers 62 comprise the layer of piezoelectric material) or of variations of electrical resistance (in the case where the cantilevers 62 comprise the layer of piezoresistive material), which can be detected, for example in differential mode.

Figure 4B:
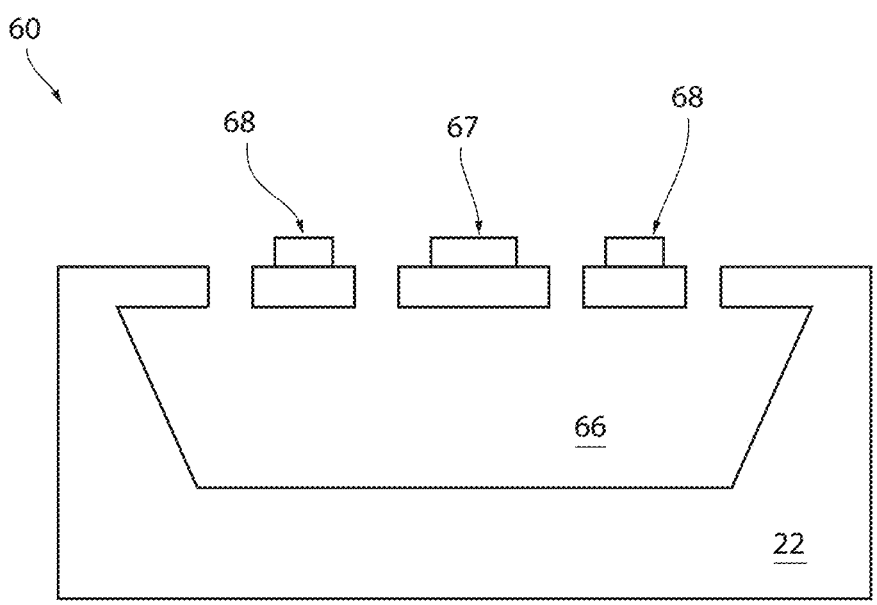

According to an embodiment illustrated in FIG. 4B, the air sensor 60 comprises a second heater element 67 and two thermopiles 68 facing sides of the second heater element 67 that are opposite to one another in the main direction of propagation of the air in the duct 24 (here in the direction of the axis X), and are for example arranged at equal distances apart from the second heater element 67. For instance, the second heater element 67 and the thermopiles 68 are suspended over a further cavity 66 provided in the first semiconductor body 22 and facing the first surface 22a. In use, when no air flow is present in the duct 24, the heat generated by the second heater element 67 is detected by the thermopiles 68 in a symmetrical way (e.g., both of the thermopiles 68 detect the same amount of heat generated by the second heater element 67); when, instead, an air flow is present in the duct 24, the heat generated by the second heater element 67 is detected by the thermopiles 68 in an asymmetrical way (e.g., the thermopiles 68 detect amounts of heat different from one another, since the air flow in the duct 24 causes, on account of known thermal effects, a greater transfer of heat to the thermopile 68 downstream of the second heater element 67 in the main direction of propagation of the air as compared to the thermopile 68 upstream of the second heater element 67 in the main direction of propagation of the air). The thermopiles 68 thus generate respective electrical signals as a function of the heat detected, which are indicative of the air flow in the duct 24.

Figure 6A:
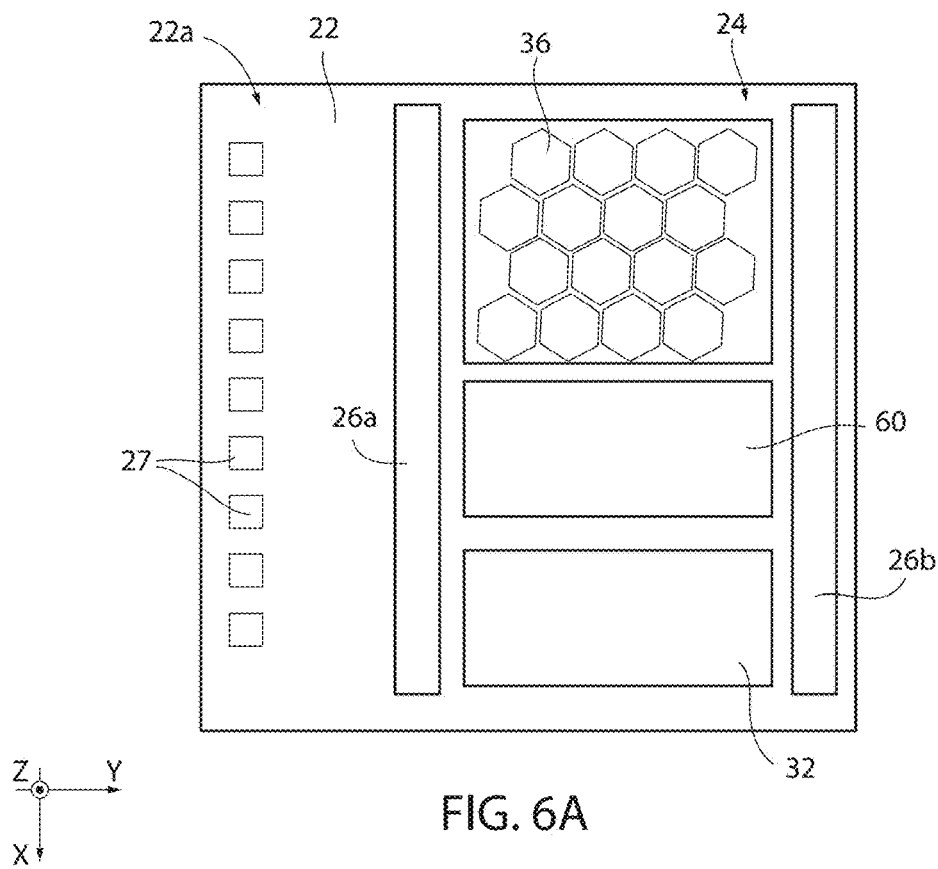
FIGS. 6A and 6B are top views of respective portions of the MEMS device of FIG. 5, rotated with respect to one another.
Figure 6B:
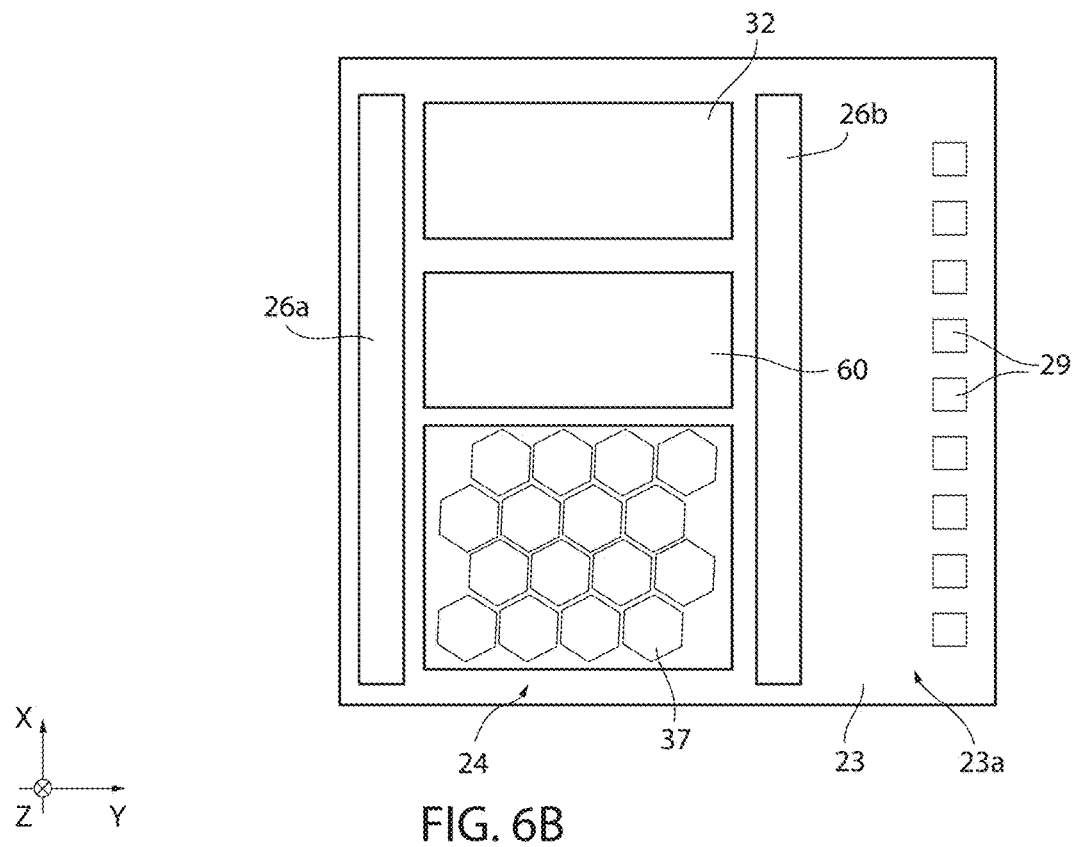

FIG. 5 shows the MEMS device 20 according to an embodiment thereof. In addition, FIGS. 6A and 6B show the first surfaces 22a and 23a of the first and second semiconductor bodies 22 and 23, respectively, of the MEMS device 20 of FIG. 5. In the embodiment of FIGS. 5, 6A, 6B, the MEMS device 20 comprises by way of example also an additional gas sensor 32 and an additional air sensor 60, which are present in the second semiconductor body 23 (however, they are optional) and for example face, respectively, the gas sensor 32 and the air sensor 60 in the first semiconductor body 22.

For example, the first surfaces 22a and 23a are arranged at a first distance $d_1$ from one another along the axis Z. According to an aspect of the present disclosure, the first distance $d_1$ is approximately equal to one quarter of the wavelength at which the acoustic waves 48 emitted by the emitter unit propagate (e.g., $d_1 = \lambda/4$, where $\lambda$ is the wavelength of the acoustic waves 48). This thus enables the emitter unit 36, the duct 24, and the PM-detection unit 37 (and thus the corresponding portions of the first and second semiconductor bodies 22 and 23) to form the acoustic resonator, as has been said previously. In this way, the acoustic pressure exerted by the acoustic waves 48 in the duct 24 is minimum at the first surface 23a of the second semiconductor body 23, and this favors aggregation of the particulate 34' on the PM-detection unit 37. For instance, the wavelength λ may be equal to approximately 3.4 mm, and the first distance $d_1$ may be equal to approximately 860 μm.

With reference to FIG. 5, the first and second spacer elements 26a and 26b form respective side walls of the duct 24, whereas the first and second semiconductor bodies 22 and 23 form a bottom wall and a top wall, respectively, of the duct 24.

The particulate sensor 30, the gas sensor 32 and, if present, the air sensor 60 face the duct 24 so as to detect the respective information as regards the air present in the duct 24. According to a non-limiting example (e.g., where the air enters the duct 24 through the first opening 24a and exits from the duct 24 through the second opening 24b), the particulate sensor 30, the air sensor 60 (if present), and the gas sensor 32 extend in succession with respect to one another from the first opening 24a to the second opening 24b.

In some embodiments, the first surface 22a of the first semiconductor body 22 further has first pads 27 electrically coupled in a way not illustrated (e.g., by conductive vias, which extend in the first semiconductor body 22 or on the first surface 22a) to the emitter unit 36, the air sensor 60 (if present), and the gas sensor 32 for electrical connection of these to the interface module 102 external to the MEMS device 20, which is configured to bias the emitter unit 36, the air sensor 60 (if present), and the gas sensor 32 and/or to detect the signals at output therefrom. Furthermore, the first surface 23a of the second semiconductor body 23 further has second pads 29 (FIG. 6B) electrically coupled in a way not illustrated (e.g., by conductive vias, which extend in the second semiconductor body 23 or on the first surface 23a) to the PM-detection unit 37, the air sensor 60 (if present in the second semiconductor body 23), and the gas sensor 32 (if present in the second semiconductor body 23) for electrical connection of these to the interface module 102 external to the MEMS device 20, which is configured to bias the PM-detection unit 37, the air sensor 60, and the gas sensor 32 (if present) and/or to detect the signals at output therefrom.

In greater detail, the first pads 27 extend in a region of the first surface 22a of the first semiconductor body 22 that is external to the duct 24 (e.g., it does not face the duct 24) so as to simplify electrical contact thereof with the interface module 102. Likewise, the second pads 29 extend in a region of the first surface 23a of the second semiconductor body 23 that is external to the duct 24 (e.g., it does not face the duct 24) so as to simplify electrical contact thereof with the interface module 102.

Figure 7:
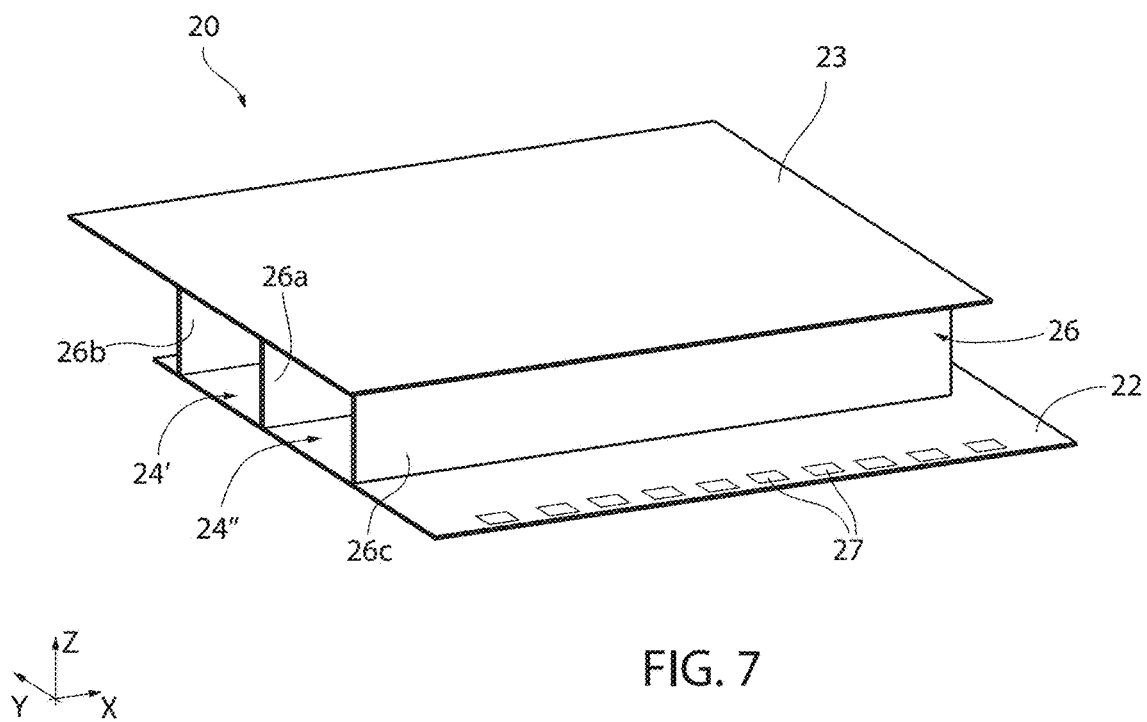
FIG. 7 is a perspective view of the MEMS device of FIG. 1, according to an embodiment.

FIG. 7 shows the MEMS device 20 according to an embodiment. Furthermore, FIGS. 8A and 8B show the first surfaces 22a and 23a of the first and second semiconductor bodies 22 and 23, respectively, of the MEMS device 20 of FIG. 7.

Figure 8A:
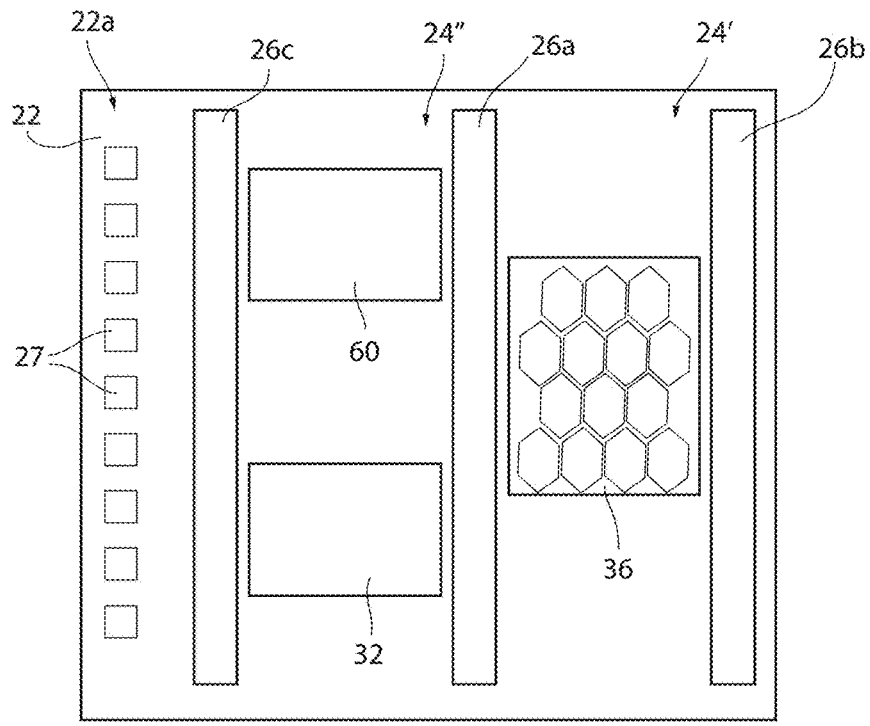
FIGS. 8A and 8B are top views of respective portions of the MEMS device of FIG. 7, rotated with respect to one another.
Figure 8B:
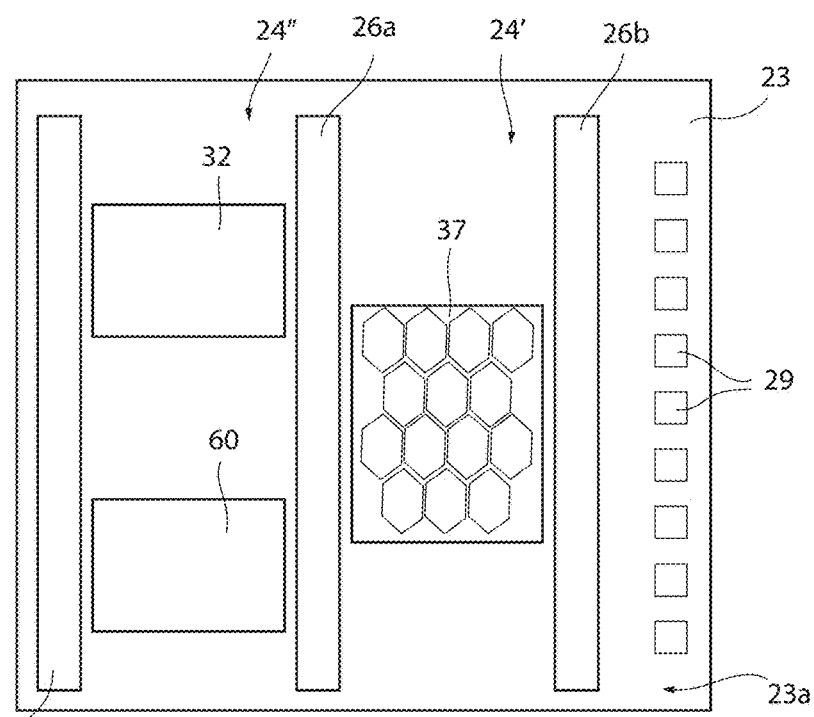

The MEMS device 20 of FIGS. 7, 8A, and 8B is similar to the MEMS device of FIG. 5; however, three spacer elements 26 are present (the first spacer element 26a, the second spacer element 26b, and a third spacer element 26c), which define two ducts 24 (herein referred to as first and second ducts 24' and 24") separated from one another by one of said spacer elements 26 (e.g., the first spacer element 26a, which is interposed along the axis Y between the second and third spacer elements 26b and 26c). Consequently, the first and second ducts 24' and 24" are fluidically in parallel with one another and, more for example, are fluidically isolated from one another (e.g., the two ducts 24' and 24" do not share the air present in each of them).

In the above embodiment, the particulate sensor 30 extends in the first duct 24', whereas the air sensor 60 (if present) and the gas sensor 32 extend in the second duct 24". However, this arrangement is provided purely by way of non-limiting example: for instance, the air sensor 60 can extend in the first duct 24' instead of in the second duct 24".

Figure 1A:
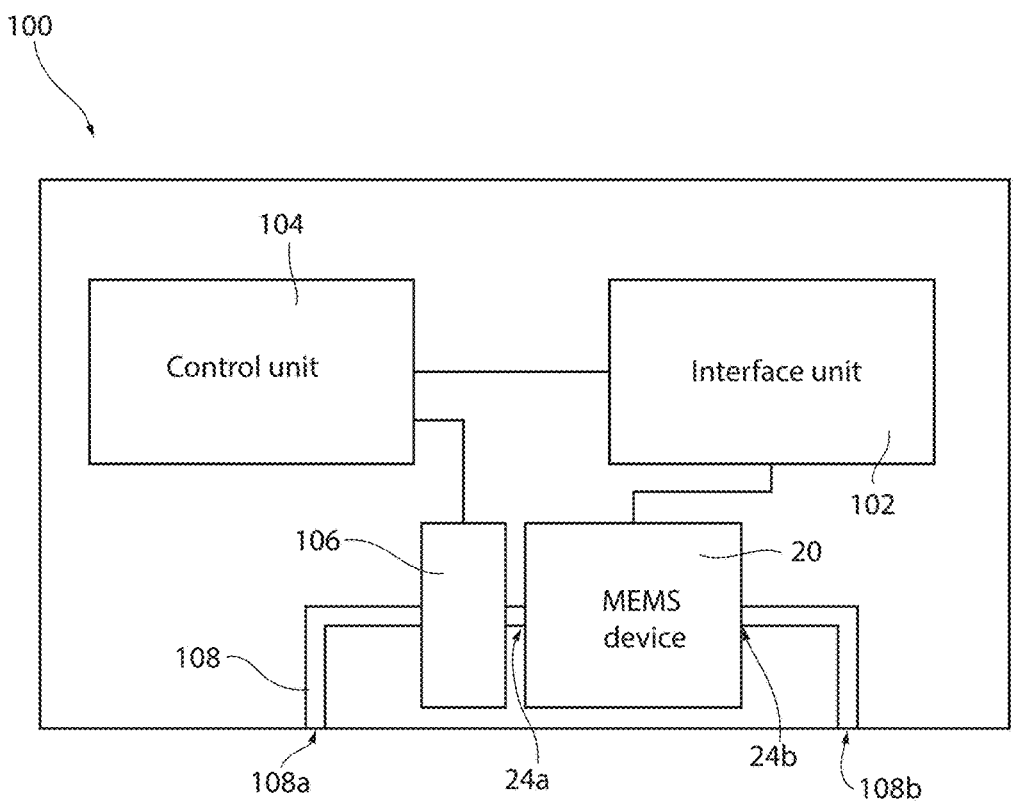
FIG. 1A is a schematic illustration of an apparatus comprising the MEMS device of FIG. 1.

FIG. 1A shows the apparatus 100 comprising the MEMS device 20. Described by way of example herein is the case where the MEMS device 20 is the one illustrated in FIG. 5; however, this discussion likewise applies also to the other embodiments of the MEMS device 20.

For example, the apparatus 100 comprises: the interface module 102 electrically coupled to the MEMS device 20 to bias the latter and to acquire the output signals thereof; a control unit 104 operatively (e.g., electrically) coupled to the interface module 103 for control of the latter, and thus for control of the MEMS device 20; an (optional) aeration channel 108 coupled to the first and second openings 24a and 24b of the duct 24 and configured to arrange in fluidic communication the MEMS device 20 with an environment external to the apparatus 100; and a pumping module 106 pneumatically coupled to the duct 24 of the MEMS device 20 (for example, extending in the aeration channel 108) and operatively (e.g., electrically) coupled to the control unit 104 so that it can be controlled by the latter to cause a flow of air through the aeration channel 108, and thus through the duct 24 of the MEMS device 20. For instance, the control unit 104 and the interface module 102 form a control module (not illustrated) of the apparatus 100, which, in use, governs the MEMS device 20 and receives the signals generated at output by the latter.

In use, the pumping module 106 (which is also obtained with MEMS technology, and which comprises for example a piezoelectric micro-pump or a micro-fan) is controlled by the control unit 104 for pumping air through the aeration channel 108 (between an inlet opening 108a and an outlet opening 108b of the aeration channel 108, which face the outside of the apparatus 100), thus generating the flow of air that, starting from the environment external to the apparatus 100, traverses the duct 24 passing from the first opening 24a to the second opening 24b. Consequently, the air that flows in the duct 24 flows therein since it is actively pumped by the pumping module 106.

In addition, the interface module 102 is controlled by the control unit 104 to bias the particulate sensor 30 (e.g., to bias the emitter unit 36 or, when the particulate sensor 30 is operated in the self-cleaning mode, to bias the PM-detection unit 37), the air sensor 60, and the gas sensor 32, and to acquire the electrical signals generated by the PM-detection unit 37, by the air sensor 60, and by the gas sensor 32 that represent the quality of air in the duct 24. In greater detail, the interface module 102 further processes, in a known way, the signals received from the particulate sensor 30, the air sensor 60, and the gas sensor 32 (e.g., filtering them in frequency, amplifying them, and converting them into respective digital signals).

The control unit 104 receives from the interface module 102 the signals coming from the particulate sensor 30, the air sensor 60, and the gas sensor 32 and processes them, in a known way, to obtain parameters indicative of the quality of the air of the environment where the apparatus 100 is located (in detail, the concentration in the air of particulate matter and gases of interest). For example, the information on the air flow obtained through the air sensor 60 makes it possible to calculate the volume of air sampled that flows in the duct 24, and thus have information on the concentrations in the air of the particulate and of gases of interest (and not only absolute values of particulate and gases of interest).

Figure 9A:
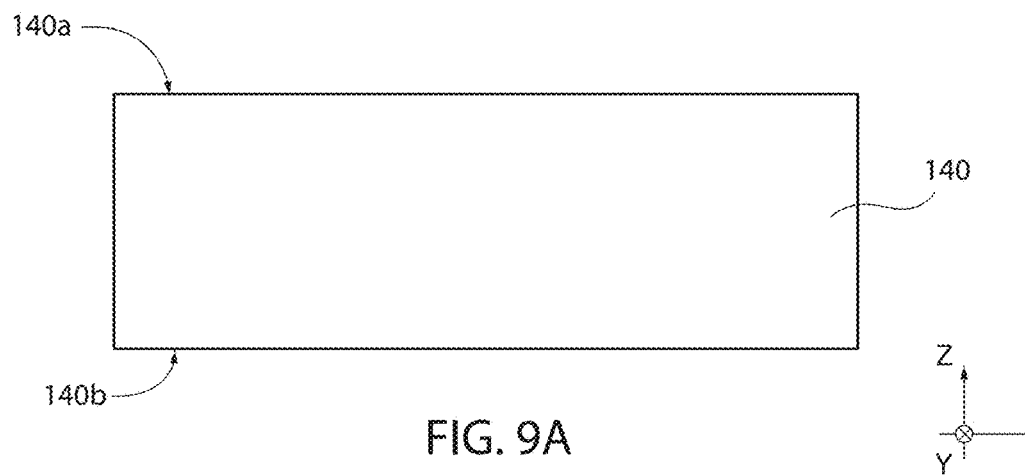
FIGS. 9A-9I are schematic lateral sectional views that illustrate respective steps for manufacturing the gas sensor and the particulate sensor of the MEMS device of FIG. 5, according to an embodiment.

With reference to FIGS. 9A-9I, a method is now described for manufacturing the emitter unit 36 and the gas sensor 32, shown herein as an example with the embodiment illustrated in FIGS. 3A and 3B, starting from a same wafer (designated by 140 in FIG. 9A). For simplicity of description the steps for manufacturing the air sensor 60, which are known, are not discussed herein. Furthermore, the manufacturing method presented here is described with reference to the first semiconductor body 22 of the MEMS device 20 of FIG. 5; however, these manufacturing steps may likewise be applied for manufacturing the second semiconductor body 23 of the MEMS device 20 (e.g., for manufacturing the PM-detection unit 37), as well as for obtaining the MEMS device 20 according to the other embodiments discussed previously.

For example, FIG. 9A shows a first wafer 140 of semiconductor material (for example, silicon), having a top surface 140a and a bottom surface 140b opposite to one another along the axis Z.

Figure 9B:
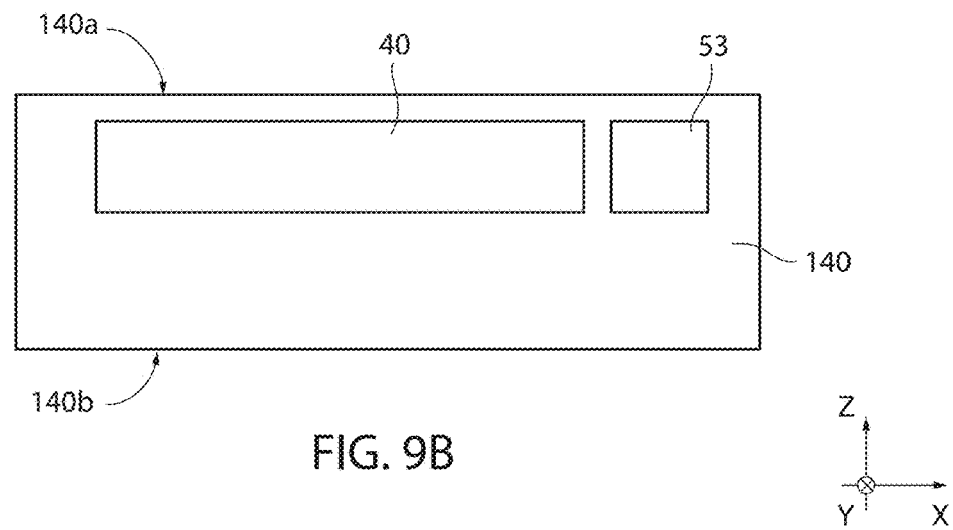

With reference to FIG. 9B, the first and second buried cavities 40 and 53 are provided in the first wafer 140, alongside one another and in positions corresponding to the top surface 140a of the first wafer 140.

According to an aspect of the present disclosure, provided by way of non-limiting example, the buried cavities 40 and 53 are obtained through a Vensens process (also referred to as Venice process). In detail, work trenches (not illustrated) are formed in regions of the first wafer 140 that are to become the buried cavities 40 and 53. Formed in each of these regions of the first wafer 140, for example using known lithographic and selective chemical etching steps, is a set of work trenches that delimit a respective plurality of pillars (not illustrated) of semiconductor material. By a step of epitaxial growth, an epitaxial layer (not illustrated) is grown on the surface of the first wafer 140 (which thus increases in thickness), facing which are the work trenches. There are then carried out one or more steps of annealing of the first wafer 140, for example in a reducing environment, for instance in a hydrogen atmosphere, at high temperatures, for example higher than 1000° C. Said one or more annealing steps cause a migration of the semiconductor atoms, here silicon, which tend to move into a position of lower energy: consequently, the semiconductor atoms of the pillars migrate completely, forming the buried cavities 40 and 53. The buried cavities 40 and 53 are thus delimited at the top by a semiconductor layer, comprising in part atoms grown epitaxially and in part migrated atoms, which forms a layer for closing the first wafer 140.

Figure 9C:
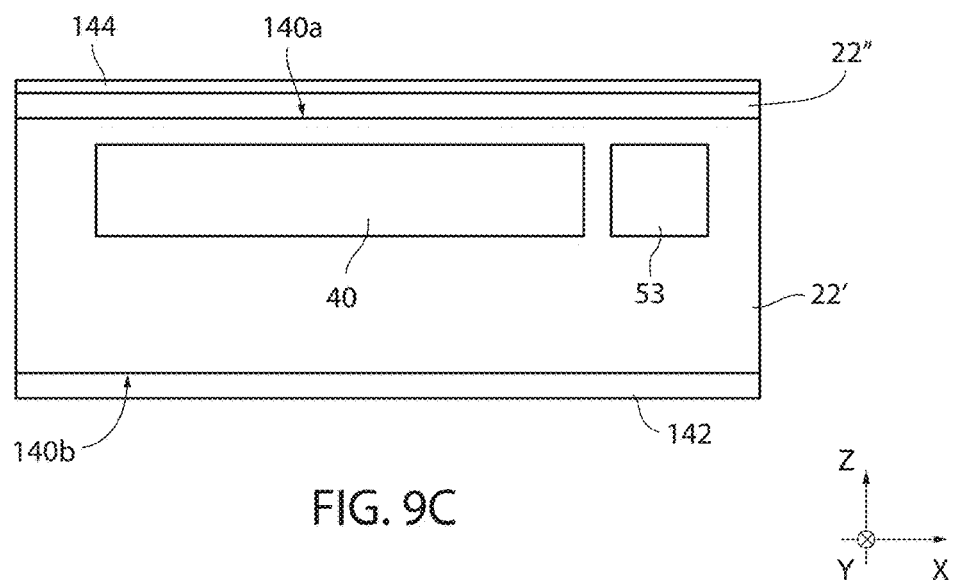

With reference to FIG. 9C, in some embodiments, the first wafer 140 undergoes an step of thermal oxidation (e.g., of a wet type, carried out at temperatures comprised between 600° C. and 1200° C.) to form the oxide layer 22" (here of $SiO_2$, and also referred to herein as top oxide layer 22") on the top surface 140a of the first wafer 140, and a bottom oxide layer 142 (here of $SiO_2$) on the bottom surface 140b of the first wafer 140. For example, the first wafer 140, processed as discussed, forms the substrate 22' that, together with the top oxide layer 22", forms the first semiconductor body 22. In addition, the portion of the first semiconductor body 22 (e.g., of the substrate 22' and of the top oxide layer 22") suspended over the first buried cavity 40 forms the membrane body 44 of the emitter unit 36.

Further, in FIG. 9C, a conductive layer 144 of metal material (e.g., gold or platinum) is formed on the top oxide layer 22", for example by physical deposition (e.g., sputtering or evaporation techniques) or chemical deposition, such as CVD (Chemical Vapor Deposition).

Figure 9D:
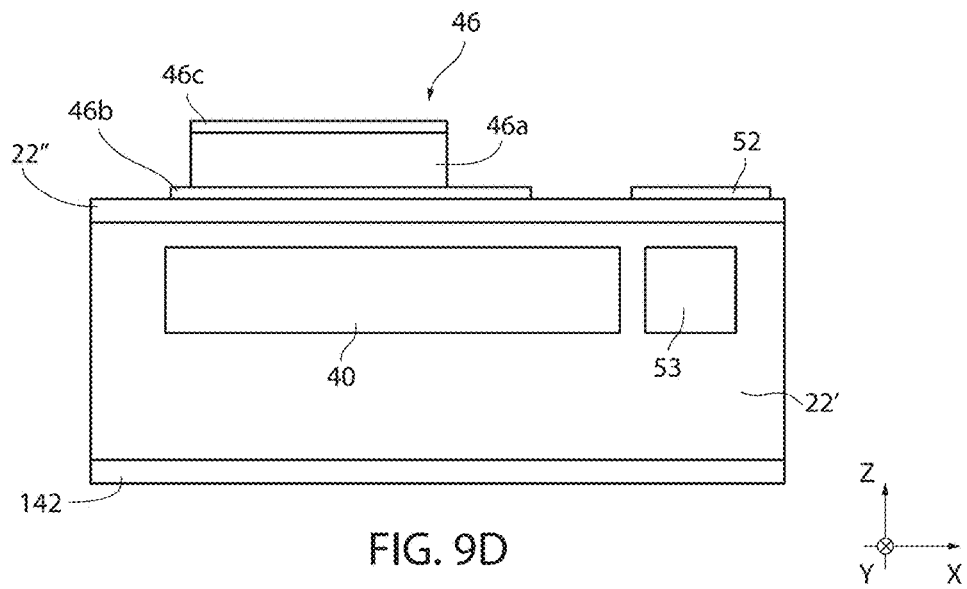

With reference to FIG. 9D, the first electrode 46b of the actuation unit 46 and the first heater element 52 of the gas sensor 32 are formed starting from the conductive layer 144. For example, the conductive layer 144 is processed, for example using known lithographic and selective chemical etching steps, in order to remove selectively first portions thereof, leaving, instead, second portions thereof (alongside the first portions) that form the first electrode 46b and the first heater element 52.

Furthermore (FIG. 9D), also formed, in succession with respect to one another, are the piezoelectric layer 46a on the first electrode 46b (e.g., by deposition using techniques of spin-coating or sputtering with piezoelectric material, such as PZT), and the second electrode 46c of the actuation unit 46 on the piezoelectric layer 46a (for instance, by physical deposition, e.g., with sputtering or evaporation techniques, or chemical deposition, e.g., with CVD, of metal material, such as gold or platinum). In this way, the actuation unit 46 for operating the emitter unit 36 is formed.

Figure 9E:
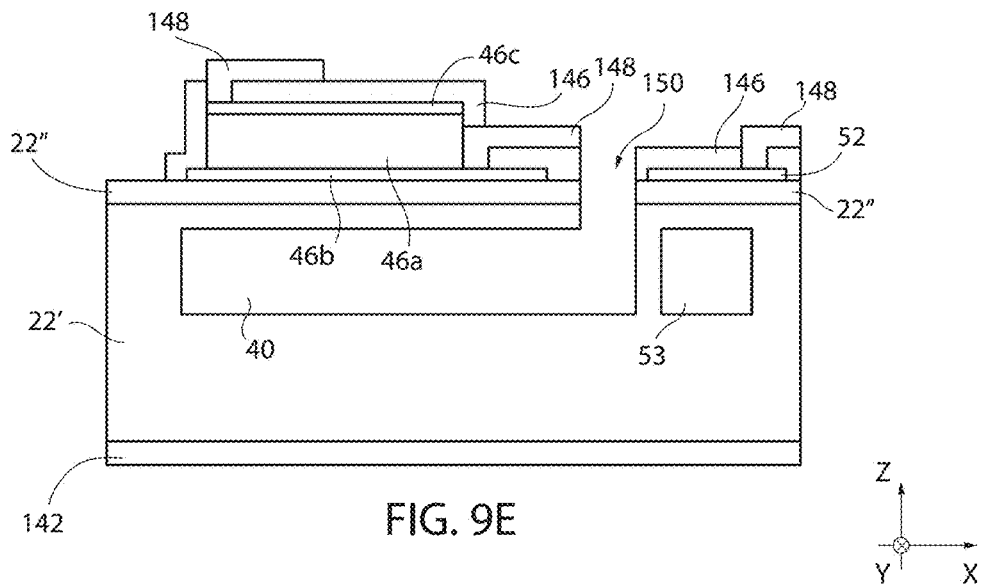

With reference to FIG. 9E, in some embodiments a passivation layer 146 is formed (for instance, by deposition, e.g., with sputtering techniques, of one or more insulating materials, such as $Si_3N_4$) on the actuation unit 46 and on the first heater element 52. The portion of the passivation layer 146 that extends over the first heater element 52 forms the electrically insulating layer 54 described previously. For example, the passivation layer 146 exposes electrical-contact regions of the first electrode 46b, of the second electrode 46c, and of the first heater element 52, in order to enable electrical contact thereof with the outside world (for example, with the interface module 102).

In addition, in some embodiments in FIG. 9E contact elements 148 of conductive material, e.g., of metal such as Ti, are formed in these electrical-contact regions that are exposed by the passivation layer 146. The contact elements 148 are electrically coupled, respectively, to the first electrode 46b, the second electrode 46c, and the first heater element 52. In a way not illustrated or discussed in detail, the contact elements 148 can be electrically connected to the interface module 102 (e.g., they can be electrically connected by respective conductive vias to the first pads 27, which in turn will be electrically connected, for example by wire-bonding techniques, to the interface module 102).

Furthermore, in some embodiments a first fluidic-communication hole 150 is provided (e.g., by known lithographic and selective-chemical-etching steps) through the entire membrane body 44 so as to enable inlet of air into the first buried cavity 40. However, even though the first fluidic-communication hole 150 is illustrated by way of example in FIG. 9E, it may be absent in the solutions illustrated in FIGS. 9H and 9I discussed herein.

Figure 9F:
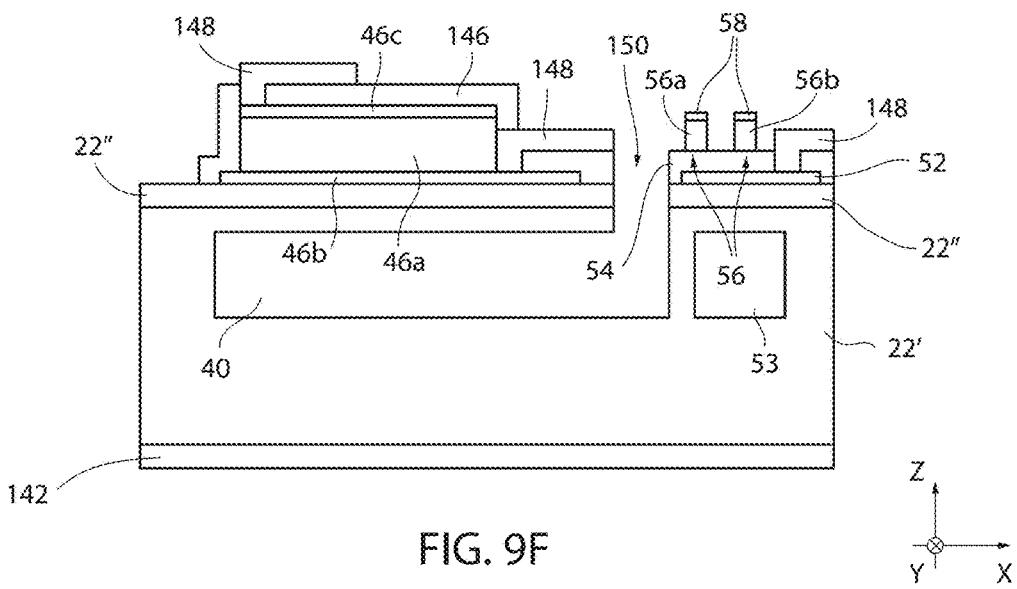

With reference to FIG. 9F, the gas-detection unit 56 is provided on the electrically insulating layer 54. For example, the first and second plates 56a and 56b are formed on the electrically insulating layer 54 (for instance, by physical deposition, e.g., with sputtering or evaporation techniques, or chemical deposition, e.g., with CVD, of metal material, such as gold or platinum) and then, the gas-adhesion layer 58 is formed (for instance, by deposition of SnO) on the first and second plates 56a and 56b.

Figure 9G:
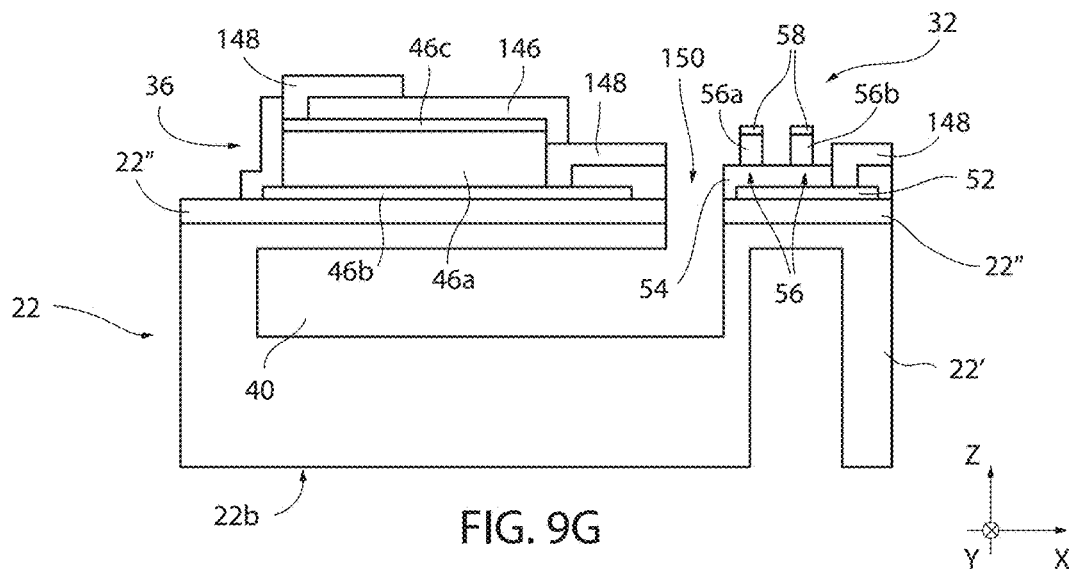

With reference to FIG. 9G, the bottom oxide layer 142 is removed, for example by wet etching.

Further, according to one aspect of the present disclosure, the second surface 22b of the first semiconductor body 22, e.g., the bottom surface 140b of the first wafer 140, undergoes etching, e.g., wet etching, in order to remove the semiconductor present under the second buried cavity 53. In other words, by a back-etching process, a trench is formed that, starting from the second surface 22b of the first semiconductor body 22, reaches the second buried cavity 53. Consequently, the second buried cavity 53 is in fluidic communication with the outside of the first semiconductor body 22, and air can enter the second buried cavity 53. This maximizes thermal dissipation of the heat generated by the gas sensor 32, improving electrical performance and reliability thereof.

Figure 9H:
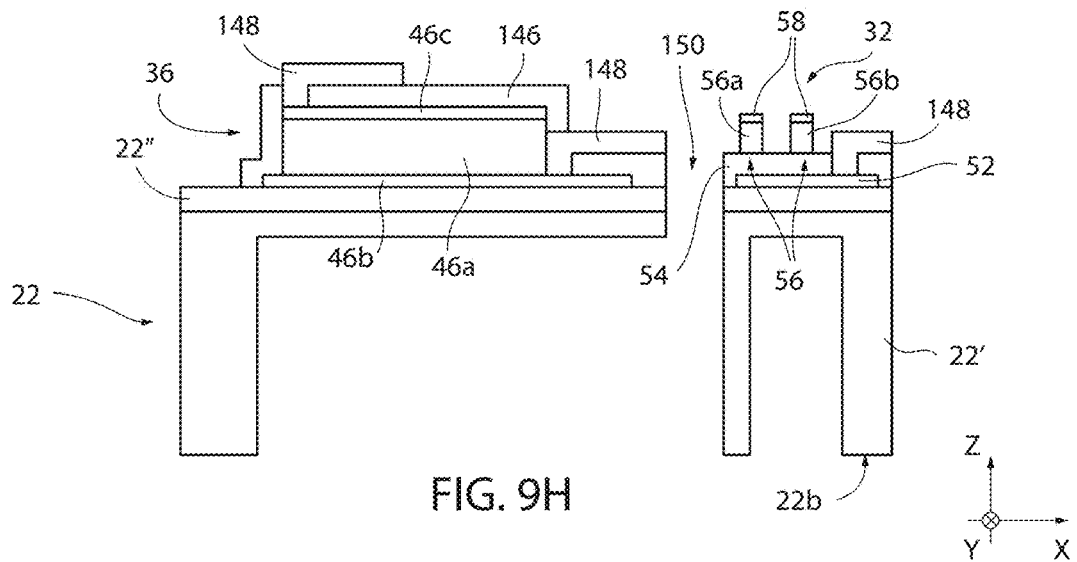

According to a further aspect of the present disclosure illustrated in FIG. 9H, etching, discussed with reference to FIG. 9G, of the second surface 22b of the first semiconductor body 22 is carried out so as to remove both the semiconductor present under the second cavity 53 and the semiconductor present under the first buried cavity 40. In other words, in addition to what has been discussed with reference to FIG. 9G, a further trench is formed that, starting from the second surface 22b of the first semiconductor body 22, reaches the first buried cavity 40. Consequently, the first buried cavity 40 is in fluidic communication with the outside of the first semiconductor body 22, and the air can enter the first buried cavity 40. In this case, the first fluidic-communication hole 150 may be absent.

Figure 9I:
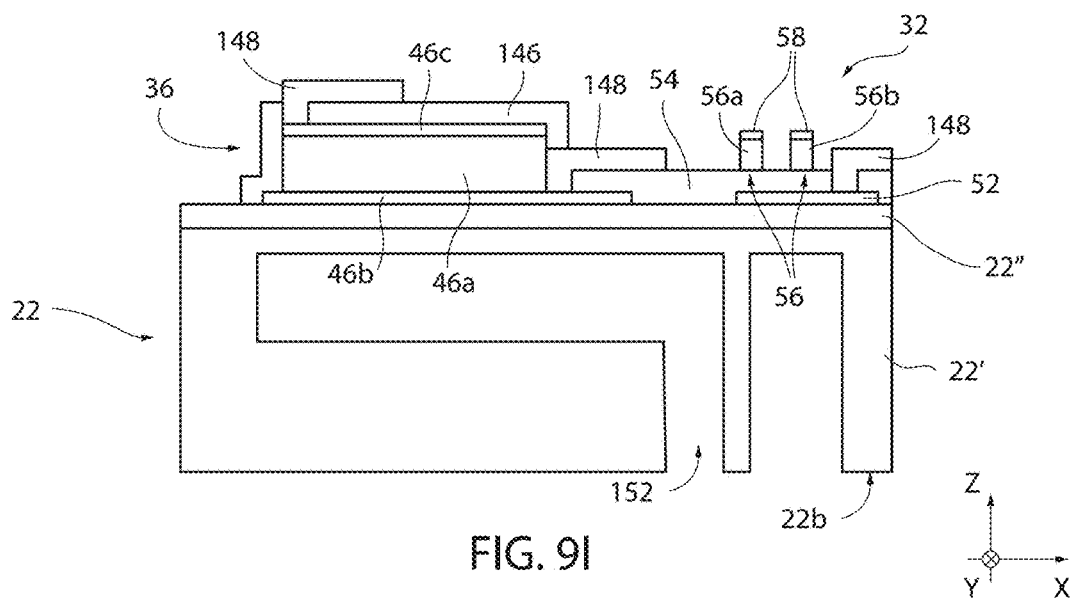

According to an aspect of the present disclosure, illustrated in FIG. 9I and alternative or in addition to what has been described with reference to FIG. 9H, etching discussed with reference to FIG. 9G is carried out, and a second fluidic-communication hole 152 is further formed that, starting from the second surface 22b of the first semiconductor body 22, reaches the first buried cavity 40, arranging it in fluidic communication with the outside of the first semiconductor body 22 (e.g., the air can enter the first buried cavity 40). In other words, in addition to what has been discussed with reference to FIG. 9G there is formed (e.g., by known lithographic and selective-chemical-etching steps) the second fluidic-communication hole 152, which, starting from the second surface 22b of the first semiconductor body 22, traverses the substrate 22' until it reaches the first buried cavity 40. In addition, the second fluidic-communication hole 152 does not generally (even though it may) overlie vertically (e.g., along the axis Z) the membrane 42 of the emitter unit 36; otherwise, the second fluidic-communication hole 152 never vertically overlies the membrane 42 of the PM-detection unit 37. When the second fluidic-communication hole 152 is present, the first fluidic-communication hole 150 may be absent (as illustrated by way of example in FIG. 9I).

The manufacturing method described with reference to FIGS. 9A-9I makes it possible to provide the emitter unit 36 and the gas sensor 32.

In a similar way, it is possible to provide the PM-detection unit 37 and, possibly, the further gas sensor 32 in the second semiconductor body 23. For example, in order to provide the PM-detection unit 37, in addition to what has been described previously there may further be formed the PM-adhesion layer 49 (when envisaged) on the actuation unit 46. In detail, the PM-adhesion layer 49 is provided on the passivation layer 146, for example by deposition (e.g., spin coating) of polymeric material such as photoresist.

According to an embodiment of the manufacturing method (not illustrated), the emitter unit 36 and the gas sensor 32 are obtained with SOI (Silicon-On-Insulator) technology.

For example, a first oxide layer is formed (e.g., by thermal oxidation) on a first surface of a first wafer of semiconductor material (silicon). An etch is carried out on the first wafer, in a first region and a second region of the first oxide layer, in order to form a first trench and, respectively, a second trench (which are to become the first and second buried cavities 40 and 53) that traverse the first oxide layer and extend in part in the first wafer. A second oxide layer is formed (e.g., by thermal oxidation) on a first surface of a second wafer of semiconductor material (silicon), which has a second surface opposite to the first surface. The first and second wafers are coupled together (for example, bonded together, for example using wafer-bonding techniques) to form a single semiconductor body in such a way that the first and second oxide layers are in contact with one another. This makes it possible to form the first and second buried cavities 40 and 53. In detail, bonding is carried out approximately in ambient atmosphere (e.g., not in vacuum conditions) so that air will remain trapped in the first and second buried cavities 40 and 53. There then follow steps similar to the ones described previously to form the emitter unit 36 and the gas sensor 32 on the second surface of the second wafer, and in greater detail in positions corresponding to the first buried cavity 40 and the second buried cavity 53, respectively.

FIGS. 10A-10G show the process for manufacturing the MEMS device 20. Described herein is the process for manufacturing the MEMS device 20 illustrated in FIG. 5; however, the following steps apply in a similar way also to the case of the other embodiments of the MEMS device 20 described previously (e.g., the MEMS device 20 of FIG. 7).

Figure 10A:
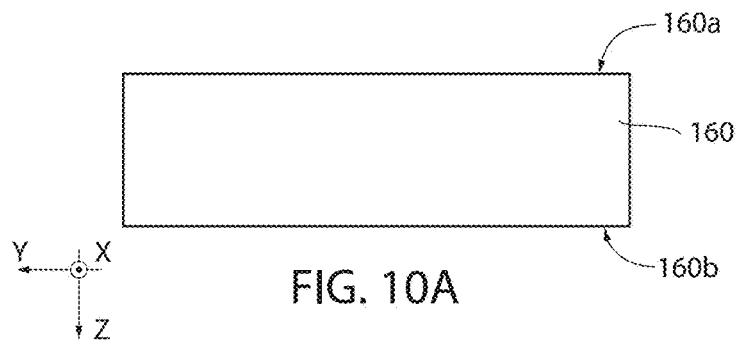
FIGS. 10A-10G are schematic lateral sectional views that illustrate respective steps for manufacturing the MEMS device of FIG. 5, according to an embodiment.

FIG. 10A shows a spacing wafer 160 of semiconductor material (e.g., silicon) having a first surface 160a and a second surface 160b opposite to one another along the axis Z.

Figure 10B:
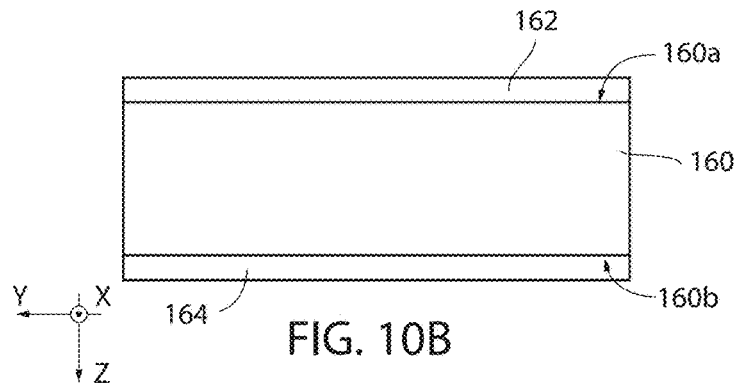

With reference to FIG. 10B, a first oxide layer 162 (e.g., of $SiO_2$) is formed (e.g., by thermal oxidation) on the first surface 160a of the spacing wafer 160, and a second oxide layer 164 (e.g., of $SiO_2$) is formed (e.g., by thermal oxidation) on the second surface 160b of the spacing wafer 160.

Figure 10C:
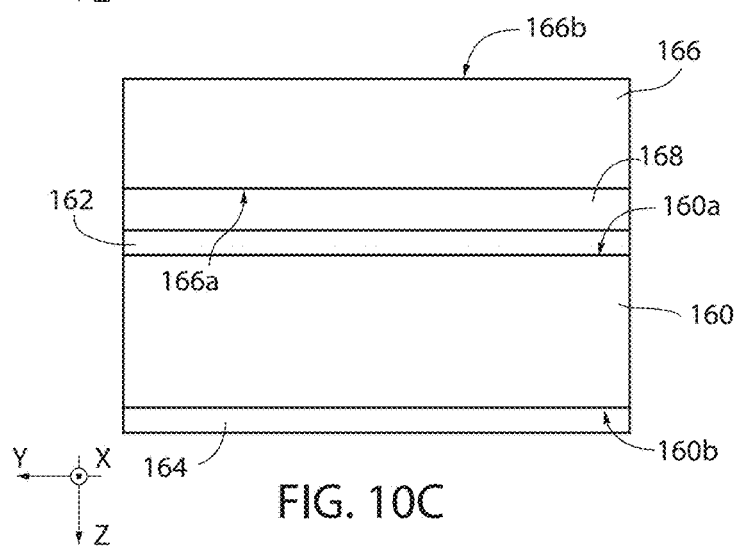

With reference to FIG. 10C, a transport wafer 166 of semiconductor material (e.g., silicon) is temporarily coupled to the spacing wafer 160 by wafer-bonding techniques. For example, the transport wafer 166 has a first surface 166a and a second surface 166b opposite to one another along the axis Z, and is bonded to the first oxide layer 162 by a temporary bonding layer 168 (e.g., of photoresist deposited by spin coating) that extends in contact with the first surface 166a of the transport wafer 166.

Figure 10D:
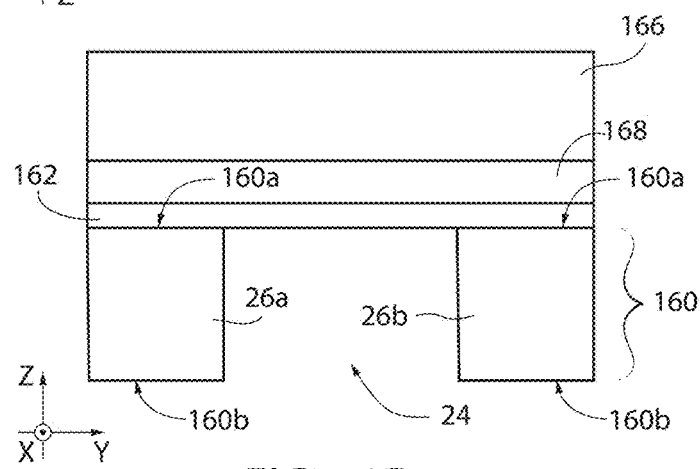

With reference to FIG. 10D, the second oxide layer 164 is removed (e.g., by selective etching) and an etch (e.g., of a wet type) is carried out in a first region of the second surface 160b of the spacing wafer 160 so as to form a duct cavity (which is to form the duct 24, and is thus designated by the same reference number) that extends right through the spacing wafer 160 until it reaches the first oxide layer 162. Second regions of the second surface 160b of the spacing wafer 160, alongside the first region of the second surface 160b of the spacing wafer 160, are not exposed to etching. Consequently, the spacing wafer 160 is not etched in said second regions, and said non-etched portions of the spacing wafer 160 form the respective spacer elements 26 (in detail, the first and second spacer elements 26a and 26b), which are thus separated from one another by the duct cavity 24. In detail, each of the spacer elements 26 has a respective first surface (corresponding to part of the first surface 160a of the spacing wafer 160, and thus designated by the same reference number) and a respective second surface (corresponding to part of the second surface 160b of the spacing wafer 160, and thus designated by the same reference number) opposite to one another along the axis Z, the first oxide layer 162 extending over the first surfaces 160a of the spacer elements 26.

Figure 10E:
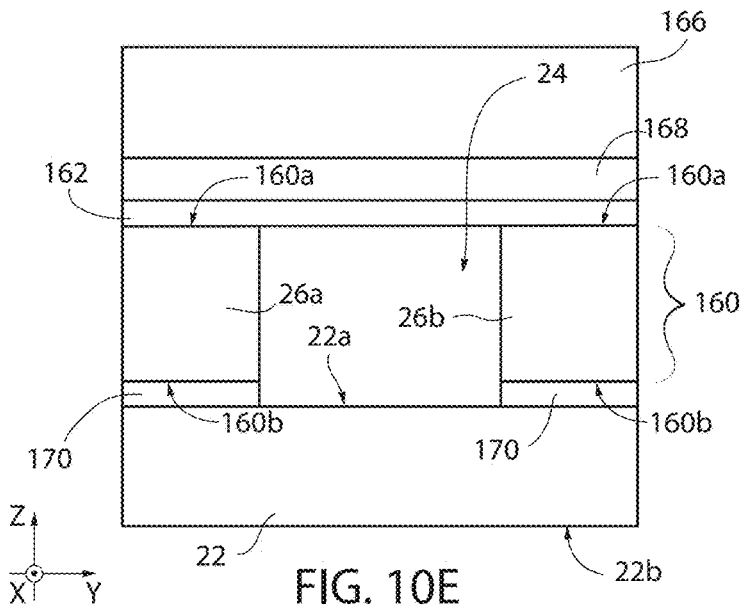

With reference to FIG. 10E, the first semiconductor body 22 is coupled to the spacer elements 26 by wafer-bonding techniques. In detail, the first semiconductor body 22 (comprising the emitter unit 36, the gas sensor 32, and in some embodiments the air sensor 60, obtained following the manufacturing steps discussed with reference to FIGS. 9A-9I) is bonded, on its own first surface 22a, to the second surfaces 160b of the spacer elements 26. Said bonding is obtained, for example, by a first bonding layer 170 (e.g., of photoresist such as SU-8), which extends between the second surfaces 160b of the spacer elements 26 and the first surface 22a of the first semiconductor body 22.

Figure 10F:
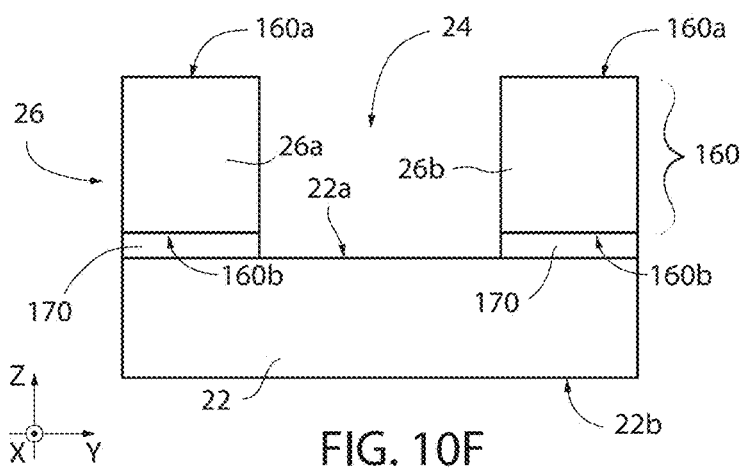

With reference to FIG. 10F, the transport wafer 166 is removed. In detail, the temporary bonding between the transport wafer 166 and the first oxide layer 162 is dissolved, for example by removing (e.g., by etching or heating) the temporary bonding layer 168, thus causing mutual detachment of the transport wafer 166 from the spacer elements 26. Further, the first oxide layer 162 is removed, for example by etching (e.g., wet etching) so as to expose the first surfaces 160a of the spacer elements 26.

Figure 10G:
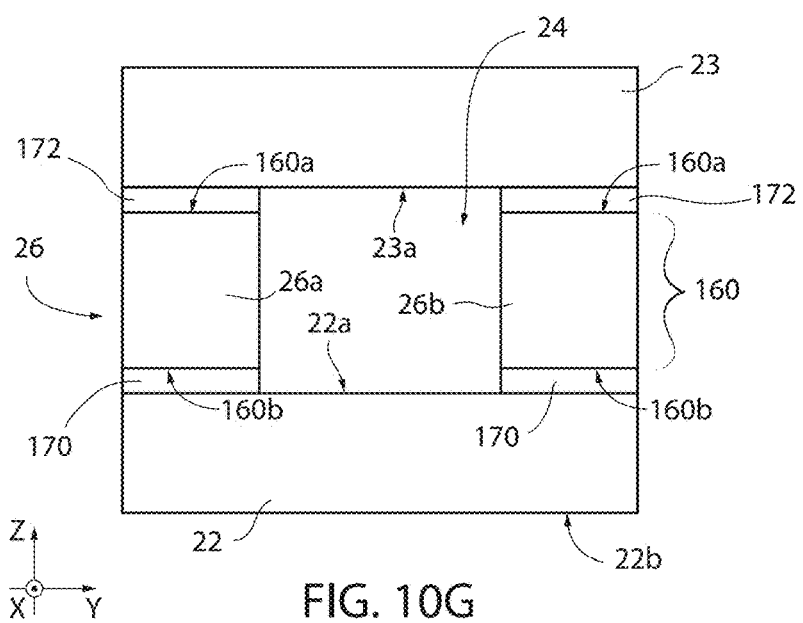

With reference to FIG. 10G, the second semiconductor body 23 is coupled to the spacer elements 26, on opposite sides of the spacer elements 26 with respect to the first semiconductor body 22, by wafer-bonding techniques. In detail, the second semiconductor body 23 (comprising the PM-detection unit 36 and, in some embodiments, the gas sensor 32 and/or the air sensor 60, obtained with the manufacturing steps discussed previously) is bonded, on its own first surface 23a, to the first surfaces 160a of the spacer elements 26. This bonding is obtained, for example, by a second bonding layer 172 (e.g., of photoresist, such as SU-8) that extends between the first surfaces 160a of the spacer elements 26 and the first surface 23a of the second semiconductor body 23.

In this way, the duct 24 and, more in general, the MEMS device 20 are formed.

From an examination of the characteristics of the disclosure provided according to the present disclosure, the advantages that it affords are evident.

The MEMS device 20 is an integrated device, obtained with MEMS technology, which has reduced dimensions and reduced levels of energy consumption, and renders possible simultaneous detection of a number of parameters indicative of the quality of the air (for example, of the concentration of particulate 34' and one or more gases 34" to be monitored in the air).

Consequently, the MEMS device 20 presents a low manufacturing cost and can be easily inserted in various apparatuses 100, and this enables a greater diffusion thereof as compared to known devices and apparatuses. In addition, use thereof is simple and maintenance thereof is automatic (self-cleaning mode of the particulate sensor 30).

Consequently, any user can purchase it and use it (also for amateur purposes), and this promotes a greater awareness in regard to problems of atmospheric pollution and makes it possible to adopt in a simpler way and on a large scale given precautions (e.g., wearing filtering masks) when the air does not meet given criteria.

In addition, the sensors discussed previously can be easily integrated, present a high sensitivity, and are not dependent upon variable working conditions (e.g., humidity, etc.).

Furthermore, the possibility of operating the PM-detection unit 37 in self-cleaning mode guarantees proper operation thereof.

The optional presence of the PM-adhesion layer 49 in the PM-detection unit 37 further improves adhesion of the particulate 34' to the PM-detection unit 37, even though it complicates cleaning thereof and can reduce the total service life during which the PM-detection unit 37 can be used.

Finally, it is clear that modifications and variations may be made to the disclosure described and illustrated herein, without thereby departing from the scope of the present disclosure, as defined in the annexed claims.

For example, the number and position in the MEMS device 20, of the particulate sensors 30, the gas sensors 32, and, if present, the air sensors 60 can vary with respect to what has been described. For instance, it is possible to have a plurality of particulate sensors 30, a plurality of gas sensors 32, and a plurality of air sensors 60. Furthermore, the gas sensors 32 and the air sensors 60 can be carried by the second semiconductor body 23 (or in part by the first semiconductor body 22 and in part by the second semiconductor body 23). For example, having a plurality of particulate sensors 30 arranged in series with one another along the axis X makes it possible to discriminate the particulate matter 34' also by size. In fact, since, as described previously, the particulate matter 34' is deflected more by acoustophoresis as its size increases, having this plurality of particulate sensors 30 makes it possible to detect the particulate matter 34' of larger size with the particulate sensors 30 closer to the first opening 24a and to detect the particulate matter 34' of smaller size with the particulate sensors 30 closer to the second opening 24b.

For instance, the particulate sensors 30 can be arranged to form one-dimensional or two-dimensional arrays. A similar consideration applies to the air sensors 60 and the gas sensors 32. Further, the gas sensors 32 can be designed (e.g., by varying the gas-adhesion layer 58) for detecting types of gases 34" different from one another, thus enabling simultaneous measurement of a number of types of gases 34".

In addition, as illustrated in FIG. 7, the number of ducts 24 parallel to one another and not communicating may be greater than two.

Furthermore, in order to obtain the first and second buried cavities 40 and 53, it is possible to replace the step described in FIG. 9B with a repetition of steps in succession to one another, each step comprising formation of a layer of semiconductor material (e.g., by epitaxial growth of silicon) on the substrate 22' (which thus increases in thickness at each step), followed by a respective etch for removing two portions of said layer of semiconductor material. By removing the portions of each layer always in the same regions, it is possible to form two respective trenches, which, once covered by a final layer of semiconductor material (e.g., formed by epitaxial growth), define the first and second buried cavities 40 and 53.

A MEMS device (20) for detecting particulate (34') and one or more gases (34") in the air, may be summarized as including a first semiconductor body (22) having a first surface (22a); a second semiconductor body (23) having a respective first surface (23a) facing the first surface (22a) of the first semiconductor body (22); and a first spacer element (26a) and a second spacer element (26b), which extend between the first surfaces (22a, 23a) of the first and second semiconductor bodies (22, 23) so as to arrange the first and second semiconductor bodies (22, 23) at a distance apart from one another, wherein the first and second semiconductor bodies (22, 23) and the first and second spacer elements (26a, 26b) form walls of a first duct (24) that has a main extension direction (X) and that has a first opening (24a) and a second opening (24b) opposite to one another in the main extension direction (X), the MEMS device (20) further comprising at least one of the following a first particulate sensor (30) including a first emitter unit (36) configured to generate acoustic waves (48) in the first duct (24), and a first particulate-detection unit (37) configured to detect the particulate (34') present in the first duct (24), wherein the first emitter unit (36) is carried by the first semiconductor body (22) and the first particulate-detection unit (37) is carried by the second semiconductor body (23) in such a way that the first emitter unit (36) and the first particulate-detection unit (37) face one another through the first duct (24), transversally with respect to the main extension direction (X); and a first gas sensor (32), which is carried by the first or second semiconductor body (22, 23), faces the first duct (24) and is configured to detect said one or more gases (34") in the air present in the first duct (24).

Each one between the first emitter unit (36) and the first particulate-detection unit (37) may include a respective membrane (42) suspended over a respective first buried cavity (40) realized in the first semiconductor body (22) and in the second semiconductor body (23), respectively, at the respective first surfaces (22a, 23a), each membrane (42) may include a respective actuation unit (46), wherein the actuation unit (46) of the first emitter unit (36) may be configured to cause the vibration, piezoelectrically, of the membrane (42) of the first emitter unit (36) so as to cause generation of the acoustic waves (48) in the air present in the first duct (24), and the first particulate-detection unit (37) may be configured to detect, by the respective actuation unit (46), a variation of vibration of the membrane (42) of the first particulate-detection unit (37), which depends upon the particulate (34') attached to the first particulate-detection unit (37).

The membrane (42) of the first particulate-detection unit (37) may further include a particulate-adhesion layer (49) that extends over the respective actuation unit (46), faces the first duct (24) and is configured to cause adherence of the particulate (34') to said membrane (42).

Each actuation unit (46) may include a piezoelectric layer (46a) interposed between a first electrode (46b) and a second electrode (46c), the first electrode (46b) extending between the piezoelectric layer (46a) and a respective membrane body (44) of the respective membrane (42), over which the actuation unit (46) extends.

The actuation unit (46) of the first particulate-detection unit (37) may be further configured to cause the vibration, in a self-cleaning mode of the first particulate-detection unit (37), the membrane (42) of the first particulate-detection unit (37) so as to cause detachment of the particulate (34') present on the membrane (42) of the first particulate-detection unit (37) from the membrane (42) of the first particulate-detection unit (37).

The first gas sensor (32) may include a first heater element (52), which extends above a second buried cavity (53) realized in the first semiconductor body (22) or in the second semiconductor body (23) at the respective first surface (22a, 23a), and may be configured to generate heat when biased; an electrically insulating layer (54), extending on the first heater element (52); and a gas-detection unit (56) configured to detect said one or more gases (34"), wherein the gas-detection unit (56) may include a first plate (56a) and a second plate (56b), which may be configured to be capacitively coupled together and extend over the electrically insulating layer (54), and a gas-adhesion layer (58), which extends over the first and second plates (56a, 56b), faces the first duct (24), and may be configured to cause adherence of said one or more gases (34") to the gas-detection unit (56).

The MEMS device may further include one or more air-flow sensors (60), which are carried by the first semiconductor body (22) and/or by the second semiconductor body (23), face the first duct (24), and are configured to measure a flow of air through the first duct (24).

Each air-flow sensor (60) may include one or more suspended structures (62), which extend over a cavity (64) realized in the first semiconductor body (22) or in the second semiconductor body (23) and facing the first duct (24), each suspended structure (62) having an end (62b) that may be free to oscillate and protrudes into the first duct (24) in such a way that the air flow, when present in the first duct (24), causes elastic deformation of the suspended structure (62).

Each air-flow sensor (60) may include a second heater element (67), which may be suspended over a cavity (66) realized in the first semiconductor body (22) or in the second semiconductor body (23) and facing the first duct (24), and may be configured to generate heat; and a first thermopile (68) and a second thermopile (68), which face respective sides of the second heater element (67) that may be opposite to one another in the main extension direction (X), the first and second thermopiles (68) being configured to detect the heat generated by the second heater element (67).

The MEMS device may further include at least one second particulate sensor (30) including a second emitter unit (36) configured to generate further acoustic waves (48) in the first duct (24), and a second particulate-detection unit (37) configured to detect the particulate (34') present in the first duct (24), wherein the second emitter unit (36) is carried by one between the first and second semiconductor bodies (22, 23) and the second particulate-detection unit (37) is carried by the other one between the first and second semiconductor bodies (22, 23) in such a way that the second emitter unit (36) and the second particulate-detection unit (37) face one another through the first duct (24), transversally with respect to the main extension direction (X).

The MEMS device may further include at least one second gas sensor (32), which is carried by the first semiconductor body (22) or the second semiconductor body (23), faces the first duct (24), and is configured to detect said one or more gases (34") in the air present in the first duct (24).

The MEMS device (20) may include the first particulate sensor (30) and the first gas sensor (32), which both face the first duct (24).

The MEMS device may further include at least one third spacer element (26c), which extends between the first surfaces (22a, 23a) of the first and second semiconductor bodies (22, 23) so as to arrange the first and second semiconductor bodies (22, 23) at a distance apart from one another, wherein the first and second semiconductor bodies (22, 23) and the first and third spacer elements (26a, 26c) form respective walls of a second duct (24) that is fluidically parallel to the first duct (24), has a respective main extension direction (X) and has a respective first opening (24a) and a respective second opening (24b) opposite to one another in the respective main extension direction (X), the MEMS device (20) may further include at least one of the following: at least one third particulate sensor (30), each third particulate sensor (30) including a third emitter unit (36) configured to generate respective acoustic waves (48) in the second duct (24), and a third particulate-detection unit (37) configured to detect the particulate (34') present in the second duct (24), wherein the third emitter unit (36) is carried by one between the first and second semiconductor bodies (22, 23), and the third particulate-detection unit (37) is carried by the other one between the first and second semiconductor bodies (22, 23) in such a way that the third emitter unit (36) and the third particulate-detection unit (37) face one another through the second duct (24), transversally with respect to the respective main extension direction (X); and at least one third gas sensor (32), each third gas sensor (32) being carried by the first semiconductor body (22) or the second semiconductor body (23), facing the second duct (24), and being configured to detect said one or more gases (34") in the air present in the second duct (24).

An apparatus (100) may be summarized as including a MEMS device (20).

The apparatus may further include a pumping module (106) of a MEMS type pneumatically coupled to the first duct (24) and configured to generate a flow of air through the first duct (24); and a control module (104, 102) configured to command the MEMS device (20) and receive signals therefrom.

A method for manufacturing a MEMS device (20) for detecting particulate (34') and one or more gases (34") in the air, may be summarized as including the steps of forming a first spacer element (26a) and a second spacer element (26b) between respective first surfaces (22a, 23a), facing one another, of a first semiconductor body (22) and of a second semiconductor body (23) so as to arrange the first and second semiconductor bodies (22, 23) at a distance apart from one another, wherein the first and second semiconductor bodies (22, 23) and the first and second spacer elements (26a, 26b) form walls of a first duct (24), which has a main extension direction (X) and has a first opening (24a) and a second opening (24b) opposite to one another in the main extension direction (X); and further forming at least one of the following: a first particulate sensor (30) including a first emitter unit (36) configured to generate acoustic waves (48) in the first duct (24) and a first particulate-detection unit (37) configured to detect the particulate (34') present in the first duct (24), wherein the first emitter unit (36) is carried by the first semiconductor body (22) and the first particulate-detection unit (37) is carried by the second semiconductor body (23) in such a way that the first emitter unit (36) and the first particulate-detection unit (37) face one another through the first duct (24) transversally with respect to the main extension direction (X); and a first gas sensor (32), which is carried by the first semiconductor body (22) or by the second semiconductor body (23), faces the first duct (24), and is configured to detect said one or more gases (34") in the air present in the first duct (24).

The step of forming the first and second spacer elements (26a, 26b) may include fixing a spacing wafer (160) to a transport wafer (166), the spacing wafer (160) having a respective first surface (160a) and a respective second surface (160b), and the transport wafer (166) having a respective first surface (166a) and a respective second surface (166b), the first surfaces (160a, 166a) of the spacing wafer (160) and of the transport wafer (166) facing one another; forming in the spacing wafer (160), by etching of the second surface (160b) of the spacing wafer (160), a duct cavity (24), which may extend from the second surface (160b) of the spacing wafer (160) to the first surface (160a) of the spacing wafer (160) and may define and separate the first spacer element (26a) and the second spacer element (26b) from one another; fixing the first semiconductor body (22) to the spacing wafer (160) in such a way that the first surface (22a) of the first semiconductor body (22) may face the second surface (160b) of the spacing wafer (160); uncoupling the spacing wafer (160) and the transport wafer (166) from one another; and fixing the second semiconductor body (23) to the spacing wafer (160) in such a way that the first surface (23a) of the second semiconductor body (23) may face the first surface (160a) of the spacing wafer (160), thus forming the first duct (24).

The step of forming the first particulate sensor (30) may include forming, at a first surface (140a) of a wafer (140), a first buried cavity (40), said wafer (140) forming the first semiconductor body (22) or the second semiconductor body (23); and forming, on the first surface (140a) of the wafer (140), an actuation unit (46) of the first emitter unit (36) or of the first particulate-detection unit (37), which may overly the first buried cavity (40).

The step of forming the actuation unit (46) may include forming, on the first surface (140a) of the wafer (140), a first electrode (46b) overlying the first buried cavity (40); forming a piezoelectric layer (46a) on the first electrode (46b); and forming a second electrode (46c) on the piezoelectric layer (46a).

The step of forming the first particulate sensor (30) may further include forming, on the actuation unit (46) of the first particulate-detection unit (37), a particulate-adhesion layer (49) configured to cause adherence of the particulate (34') to the first particulate-detection unit (37).

The step of forming the first gas sensor (32) may include forming a second buried cavity (53) at the first surface (140a) of the wafer (140) and alongside the first buried cavity (40); forming, on the first surface (140a) of the wafer (140), a first heater element (52) overlying the second buried cavity (53) and configured to generate heat when biased; forming an electrically insulating layer (54) on the first heater element (52); and forming, on the electrically insulating layer (54), a gas-detection unit (56) configured to detect said one or more gases (34"), wherein the gas-detection unit (56) may include a first plate (56a) and a second plate (56b), which may be configured to be capacitively coupled together and extend over the electrically insulating layer (54), and a gas-adhesion layer (58), which may extend over the first and second plates (56a, 56b), may face the first duct (24), and may be configured to cause adherence of said one or more gases (34") to the gas-detection unit (56).

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A MEMS device, comprising:
a first semiconductor body having a first surface of the first semiconductor body;
a second semiconductor body having a first surface of the second semiconductor body facing the first surface of the first semiconductor body;
a first spacer element and a second spacer element, each between the first surface of the first semiconductor body and the first surface of the second semiconductor body, the first and second semiconductor bodies at a distance apart from one another;
a first duct between the first and second semiconductor bodies and between the first and second spacer elements, the first duct having a main extension direction and a first opening and a second opening opposite to one another in the main extension direction;
a first particulate sensor including a first emitter unit configured to generate acoustic waves in the first duct, and a first particulate-detection unit configured to detect a particulate present in the first duct, the first emitter unit on the first semiconductor body and the first particulate-detection unit on the second semiconductor body, the first emitter unit and the first particulate-detection unit facing one another through the first duct in a direction that transvers the main extension direction; and
a first gas sensor on one of the first semiconductor body or the second semiconductor body, facing the first duct and configured to detect a gas in air present in the first duct.

2. The MEMS device according to claim 1, wherein the first emitter unit and the first particulate-detection unit each comprises a respective membrane suspended over a respective buried cavity in the first semiconductor body and in the second semiconductor body, respectively, at the respective first surfaces, each membrane comprising a respective actuation unit,
wherein the actuation unit of the first emitter unit is configured to cause the membrane of the first emitter unit vibrate piezoelectrically to generate acoustic waves in a fluidic medium present in the first duct, and
wherein the actuation unit of the first particulate-detection unit is configured to detect a variation of vibration of the membrane of the first particulate-detection unit.

3. The MEMS device according to claim 2, wherein the membrane of the first particulate-detection unit further comprises a particulate-adhesion layer that extends over the actuation unit of the first particulate-detection unit, the particulate-adhesion layer facing the first duct and configured to cause adherence of the particulate to the membrane of the first particulate-detection unit.

4. The MEMS device according to claim 2, wherein each actuation unit comprises a first electrode, a second electrode, and a piezoelectric layer interposed between the first electrode and the second electrode, the first electrode extending between the piezoelectric layer and a respective membrane.

5. The MEMS device according to claim 2, wherein the actuation unit of the first particulate-detection unit is further configured to cause, in a self-cleaning mode of the first particulate-detection unit, the membrane of the first particulate-detection unit to vibrate.

6. The MEMS device according to claim 1, wherein the first gas sensor comprises:
a first heater element, which extends over a second buried cavity in the one of the first semiconductor body or the second semiconductor body at the respective first surface, and is configured to generate heat when biased;
an electrically insulating layer, extending on the first heater element; and
a gas-detection unit including:
a first plate and a second plate extending over the electrically insulating layer, the first plate and the second plate configured to be capacitively coupled together; and
a gas-adhesion layer extending over the first and second plates, facing the first duct, and configured to adhere the gas.

7. The MEMS device according to claim 1, further comprising one or more air-flow sensors on one of more of the first semiconductor body or the second semiconductor body, the one or more air-flow sensors each facing the first duct, and configured to measure a flow of air through the first duct.

8. The MEMS device according to claim 7, wherein the one or more air-flow sensors each comprises one or more suspended structures, which extend over a cavity in the first semiconductor body or in the second semiconductor body and face the first duct, each suspended structure having an end that is free to oscillate, protrudes into the first duct, and is configured to elastically deform in response to the flow of air in the first duct.

9. The MEMS device according to claim 7, wherein the one or more air-flow sensors each comprises:
a second heater element suspended over a cavity in the first semiconductor body or in the second semiconductor body and facing the first duct, and configured to generate heat; and
a first thermopile and a second thermopile, which face respective sides of the second heater element that are opposite to one another in the main extension direction, the first and second thermopiles being configured to detect the heat generated by the second heater element.

10. The MEMS device according to claim 1, further comprising at least one second particulate sensor comprising a second emitter unit configured to generate further acoustic waves in the first duct, and a second particulate-detection unit configured to detect the particulate present in the first duct, wherein the second emitter unit is on one of the first and second semiconductor bodies and the second particulate-detection unit is on another one of the first and second semiconductor bodies, the second emitter unit and the second particulate-detection unit facing one another through the first duct in the direction that transverses the main extension direction.

11. The MEMS device according to claim 1, further comprising at least one second gas sensor on the first semiconductor body or the second semiconductor body, facing the first duct, and configured to detect the gas in the air present in the first duct.

12. The MEMS device according to claim 1, wherein the MEMS device comprises the first particulate sensor and the first gas sensor, which both face the first duct.

13. The MEMS device according to claim 1, further comprising at least one third spacer element, which extends between the first surfaces of the first and second semiconductor bodies,
wherein the first and second semiconductor bodies and the first and third spacer elements form respective walls of a second duct that is fluidically parallel to the first duct and has a respective first opening and a respective second opening opposite to one another in the main extension direction,
the MEMS device further comprising at least one of the following:
at least one third particulate sensor, each third particulate sensor comprising a third emitter unit configured to generate respective acoustic waves in the second duct, and a third particulate-detection unit configured to detect the particulate present in the second duct, wherein the third emitter unit is on one of the first and second semiconductor bodies, and the third particulate-detection unit is on another one of the first and second semiconductor bodies, the third emitter unit and the third particulate-detection unit facing one another through the second duct, in a direction that transverses the main extension direction; and at least one third gas sensor, each third gas sensor on the first semiconductor body or the second semiconductor body, facing the second duct, and being configured to detect the gas in the air present in the second duct.

14. An apparatus comprising a MEMS device, the MEMS device including:
a first semiconductor body having a first surface;
a second semiconductor body having a second surface facing the first surface of the first semiconductor body;
a first spacer element and a second spacer element between the first surface of the first semiconductor body and the second surface of the second semiconductor body;
a first duct between the first and second semiconductor bodies and between the first and second spacer elements;
a first emitter unit on the first semiconductor body, the first emitter unit including a first membrane suspended over a first buried cavity in the first semiconductor body; and
a first particulate detection unit on the second semiconductor body, the first particulate detection unit including a second membrane suspended over a second buried cavity in the second semiconductor body, the first membrane facing the second membrane through the first duct.

15. The apparatus according to claim 14, further comprising:
a pumping module of a MEMS type pneumatically coupled to the first duct and configured to generate a flow of air through the first duct; and
a control module configured to command the MEMS device and receive signals from the MEMS device.

16. A method for manufacturing a MEMS device, comprising:
forming a first spacer element and a second spacer element between respective first surfaces of a first semiconductor body and of a second semiconductor body, wherein the first and second semiconductor bodies and the first and second spacer elements form walls of a first duct, which has a main extension direction and has a first opening and a second opening opposite to one another in the main extension direction; and
forming at least one of:
a first particulate sensor including a first emitter unit configured to generate an acoustic wave in the first duct and a first particulate-detection unit configured to detect a particulate present in the first duct, wherein the first emitter unit is on the first semiconductor body and the first particulate-detection unit is on the second semiconductor body, the first emitter unit and the first particulate-detection unit facing one another through the first duct; and
a first gas sensor, on one of the first semiconductor body or the second semiconductor body, facing the first duct, and configured to detect a gas in air present in the first duct.

17. The method according to claim 16, wherein the forming the first and second spacer elements comprises:
fixing a spacing wafer to a transport wafer, the spacing wafer having a first surface and a second surface, and the transport wafer having a first surface and a second surface, the first surface of the spacing wafer and the first surface of the transport wafer facing one another;
forming in the spacing wafer a duct cavity, which extends from a second surface of the spacing wafer to the first surface of the spacing wafer, the duct cavity separating the first spacer element and the second spacer element from one another;
fixing the first semiconductor body to the spacing wafer, the first surface of the first semiconductor body facing the second surface of the spacing wafer;
uncoupling the spacing wafer and the transport wafer from one another; and
fixing the second semiconductor body to the spacing wafer, the first surface of the second semiconductor body facing the first surface of the spacing wafer.

18. The method according to claim 16, comprising forming the first particulate sensor, which includes:
forming, at a first surface of a wafer, a first buried cavity; and
forming, on the first surface of the wafer, an actuation unit overlapping the first buried cavity.

19. The method according to claim 18, wherein the forming the actuation unit comprises:
forming, on the first surface of the wafer, a first electrode overlapping the first buried cavity;
forming a piezoelectric layer on the first electrode; and
forming a second electrode on the piezoelectric layer.

20. The method according to claim 18, wherein the forming the first particulate sensor further comprises forming, on the actuation unit, a particulate-adhesion layer.

21. The method according to claim 18, comprising:
forming a second buried cavity at the first surface of the wafer and alongside the first buried cavity;
forming, on the first surface of the wafer, a first heater element overlapping the second buried cavity and configured to generate heat when biased;
forming an electrically insulating layer on the first heater element; and
forming, on the electrically insulating layer, a gas-detection unit, the gas-detection unit including a first plate and a second plate extending over the electrically insulating layer, the first plate and the second plate configured to be capacitively coupled together.

* * * * *